US010988187B2

(12) United States Patent
Schounard et al.

(10) Patent No.: US 10,988,187 B2
(45) Date of Patent: Apr. 27, 2021

(54) UTILITY VEHICLE

(71) Applicant: Polaris Industries Inc., Medina, MN (US)

(72) Inventors: Kyle J. Schounard, Osceola, WI (US); William L. Barbrey, Lino Lakes, MN (US); Shawn D. Peterson, East Bethel, MN (US); Daniel S. Weber, North Branch, MN (US); Derek M. Frie, Lino Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 131 days.

(21) Appl. No.: 16/377,676

(22) Filed: Apr. 8, 2019

(65) Prior Publication Data
US 2019/0308672 A1 Oct. 10, 2019

Related U.S. Application Data

(60) Provisional application No. 62/655,384, filed on Apr. 10, 2018.

(51) Int. Cl.
B62D 31/00 (2006.01)
B60H 1/24 (2006.01)
(Continued)

(52) U.S. Cl.
CPC ............. *B62D 31/00* (2013.01); *B60H 1/246* (2013.01); *B60H 1/3229* (2013.01); *B60K 5/00* (2013.01);
(Continued)

(58) Field of Classification Search
CPC ........ B62D 31/00; B62D 21/02; B62D 25/04; B60K 5/00; B60K 2005/003; B60H 1/246; B60H 1/3229
See application file for complete search history.

(56) References Cited

U.S. PATENT DOCUMENTS 2,344,864 A   3/1944  Griswold
5,129,375 A   7/1992  Takane et al.
(Continued)

FOREIGN PATENT DOCUMENTS

CA      2901541       9/2014
JP   2008-308121 A   12/2008

OTHER PUBLICATIONS

International Preliminary Report on Patentability, dated Jan. 3, 2019, for related International patent application No. PCT/US2017/038985; 9 pages.
(Continued)

Primary Examiner — D Glenn Dayoan
Assistant Examiner — Melissa Ann Bonifazi
(74) Attorney, Agent, or Firm — Faegre Drinker Biddle & Reath LLP

(57) ABSTRACT

A utility vehicle is described having front and rear passenger area, and an HVAC system provides treated air to both front and rear areas. The front area includes a tunnel extending longitudinally rearwardly, and a low profile duct extends within the tunnel to communicate treated air to the rear passenger area. The frame has been modified to mount a drive shaft carrier bearing to maximize the area under the tunnel for hose routing. The frame has been modified to maximize the ingress area for the foot of the rear passenger. The frame has been modified to better seal the vehicle when doors are utilized.

12 Claims, 31 Drawing Sheets

(51) Int. Cl.
*B60H 1/32* (2006.01)
*B62D 21/02* (2006.01)
*B60K 5/00* (2006.01)
*B62D 25/04* (2006.01)

(52) U.S. Cl.
CPC .............. *B62D 21/02* (2013.01); *B62D 25/04* (2013.01); *B60K 2005/003* (2013.01)

(56) References Cited

U.S. PATENT DOCUMENTS

| | | |
|---|---|---|
| 5,976,044 A | 11/1999 | Kuyama |
| 7,013,646 B1 | 3/2006 | Serkh et al. |
| 7,878,285 B2 | 2/2011 | Oda et al. |
| 8,104,524 B2 | 1/2012 | Manesh et al. |
| 8,176,957 B2 | 5/2012 | Manesh et al. |
| 8,870,711 B2 | 10/2014 | Pohl et al. |
| 8,997,908 B2 | 4/2015 | Kinsman et al. |
| 9,273,760 B2 | 3/2016 | Pohl |
| 9,650,078 B2 | 5/2017 | Kinsman |
| 9,738,134 B1 | 8/2017 | Rittenour et al. |
| 9,789,909 B2 | 10/2017 | Erspamer |
| 10,166,836 B2 | 1/2019 | Rittenour et al. |
| 2004/0172955 A1 | 9/2004 | Runk et al. |
| 2005/0181905 A1 | 8/2005 | Ali et al. |
| 2006/0107920 A1 | 5/2006 | Serkh et al. |
| 2008/0032618 A1 | 2/2008 | Katoh |
| 2009/0263259 A1 | 10/2009 | Picton et al. |
| 2010/0078253 A1 | 4/2010 | Rolfe et al. |
| 2012/0258839 A1 | 10/2012 | Smithson et al. |
| 2014/0265285 A1 | 9/2014 | Erspamer |
| 2015/0047917 A1 | 2/2015 | Burt et al. |
| 2015/0330351 A1 | 11/2015 | Leone et al. |
| 2016/0023621 A1 | 1/2016 | Books et al. |
| 2016/0090958 A1 | 3/2016 | Berkson |

OTHER PUBLICATIONS

International Search Report and Written Opinion received for PCT Patent Application No. PCT/US2017/038985, dated Sep. 27, 2017, 11 pages.
Office Action issued by the Canadian Intellectual Property Office, dated Jun. 4, 2020, for Canadian Patent Application No. 3,038,943; 6 pages.
Office Action issued by the Canadian Intellectual Property Office, dated Jan. 8, 2021, for Canadian Patent pplication No. 3,038,943; 6 pages.

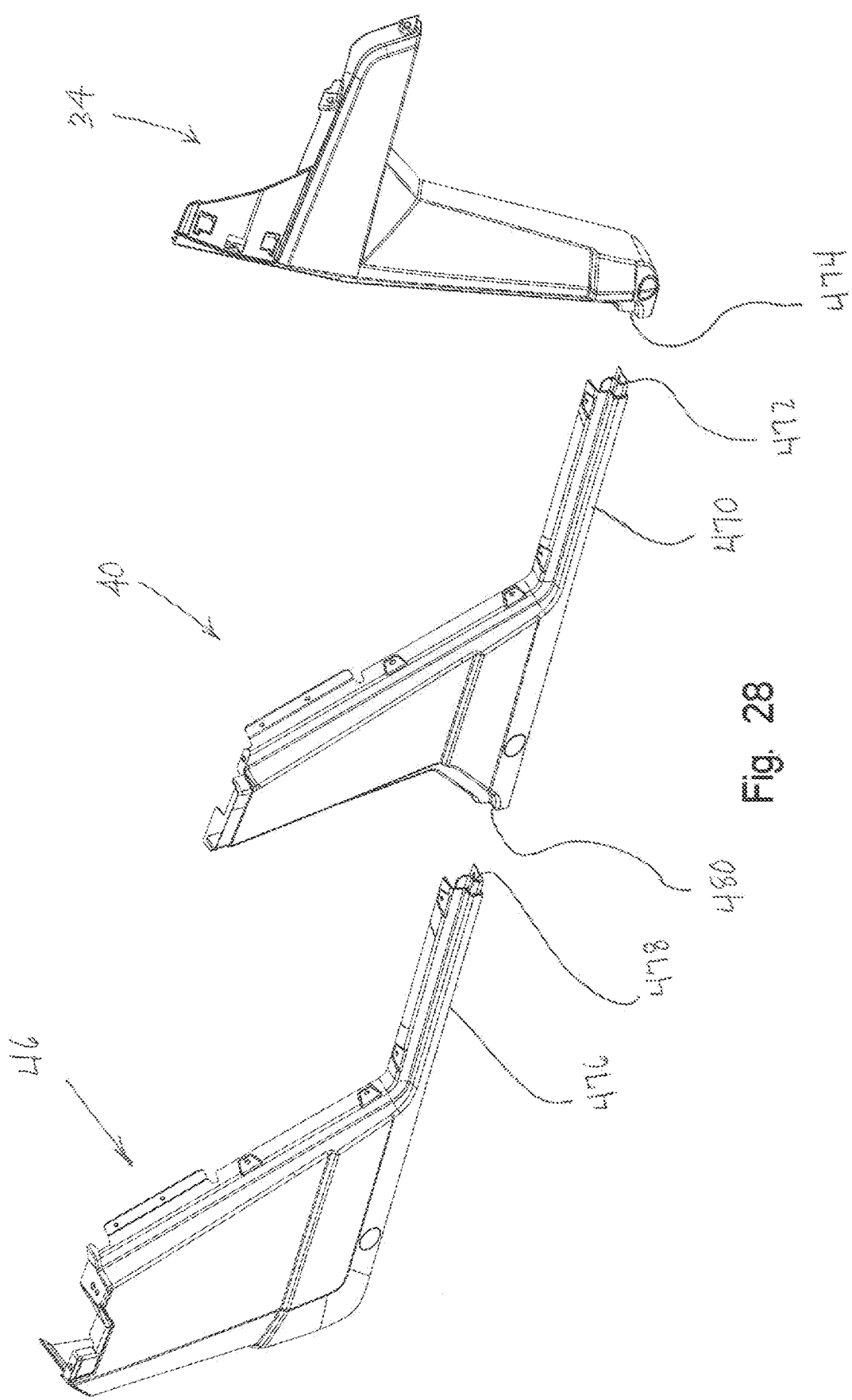

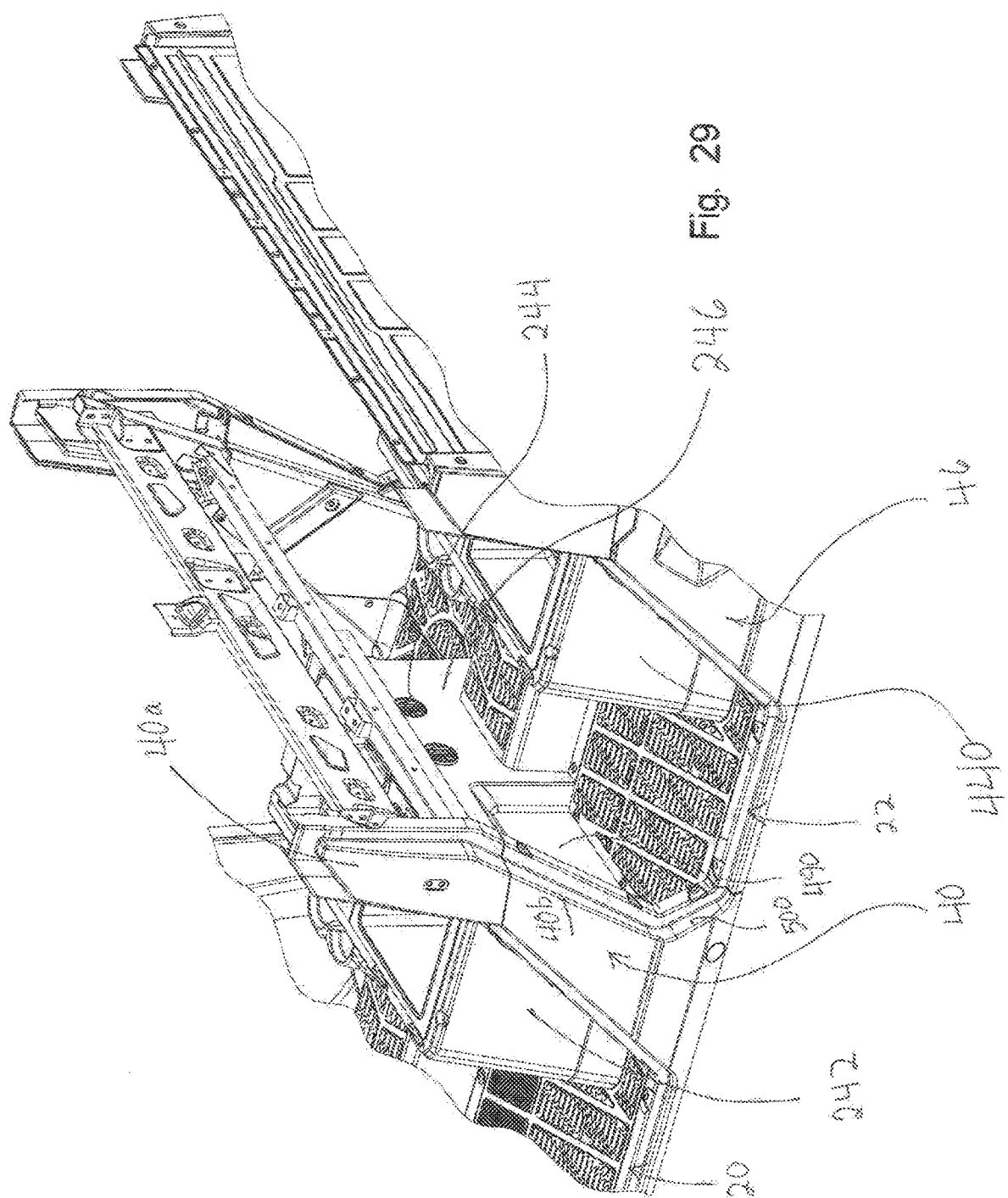

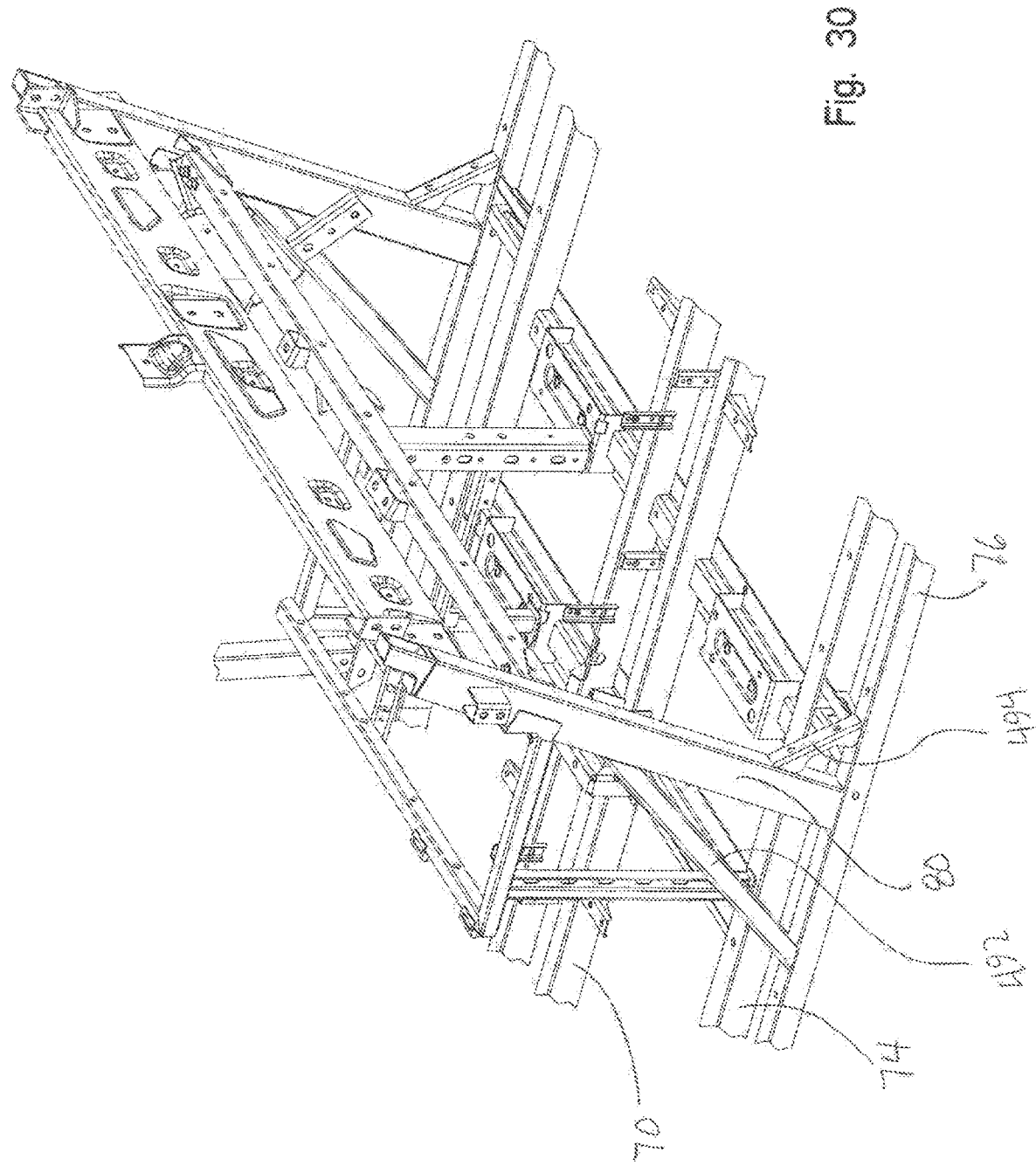

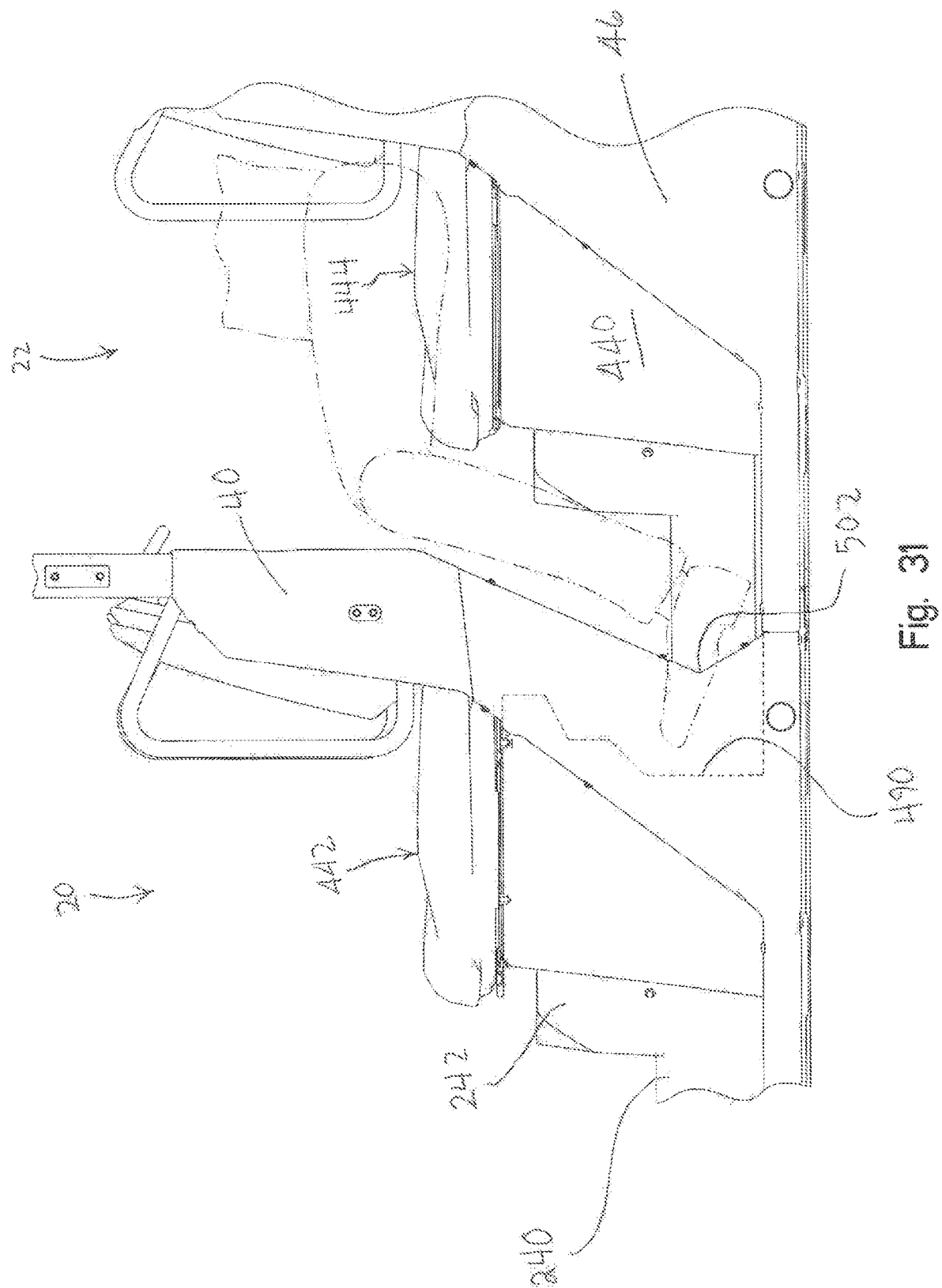

UTILITY VEHICLE

RELATED APPLICATIONS

This application claims the benefit of U.S. Provisional Patent Application Ser. No. 62/655,384, filed Apr. 10, 2018, the disclosure of which is expressly incorporated by reference herein.

BACKGROUND OF THE DISCLOSURE

The subject disclosure generally relates to utility vehicles and more particularly to utility vehicles having front and rear passenger compartments.

SUMMARY

It is known to have utility vehicles for operation in rough terrain, for example see U.S. Pat. No. 9,650,078. It is also known to have such utility vehicles configured with a front seat for an operator and up to two passengers, and a rear seat for up to three additional passengers, see generally U.S. Pat. No. 9,789,909.

In a first embodiment, a utility vehicle comprises a utility vehicle, comprising a longitudinally extending frame having a longitudinal centerline, the frame comprising a front frame portion and a rear frame portion; ground engaging members supporting the frame; a cab comprising a front seating section; a rear seating section; a mid-panel forward of the rear seating section separating the front and rear seating sections; and an HVAC duct extending through and under the front seating section and coupling to the mid panel to deliver treated air to the rear seating area.

In another embodiment, a utility vehicle comprises a frame having a longitudinal centerline, the frame comprising at least two longitudinally extending frame members, a first frame member having a first upper surface, and a reduced height section lower than the first upper surface, the frame further comprising a second frame member having a second upper surface and a mounting portion raised relative to the second upper surface; ground engaging members supporting the frame; a powertrain coupled to the frame; a driveshaft coupled between the powertrain and at least some of the ground engaging members; a driveshaft carrier bearing supporting the driveshaft along a length thereof, wherein the carrier bearing includes a flange surrounding at least part of the carrier bearing and the flange includes a first flange coupling point coupled to the reduced height section and a second flange coupling point coupled to the mounting portion, such that a line drawn through the first flange coupling point and the second flange coupling point defines a line that is angled relative to a horizontal axis.

In yet another embodiment, a utility vehicle comprises a utility vehicle, comprising a longitudinally extending frame having a longitudinal centerline, the frame comprising a front frame portion and a rear frame portion, the frame further including front pillar portions extending upwardly, rear pillar portions extending upwardly, and center pillar portions extending upwardly, where the center pillar portions extend rearwardly as progressing upwardly; ground engaging members supporting the frame; a cab comprising a front seating section, generally positioned longitudinally between the front pillar portions and center pillar portions, and further comprising a front floor; and a rear seating section, generally positioned longitudinally between the center pillar portions and rear pillar portions, and further comprising a rear floor; a panel portion enclosing each of the center pillar portions, wherein a forwardmost position is defined in the panel portion adjacent to the rear floor and angles rearwardly and upwardly.

In yet another embodiment, a utility vehicle comprises a longitudinally extending frame having a longitudinal centerline, the frame comprising a front frame portion and a rear frame portion, the frame further including front pillar portions extending upwardly, rear pillar portions extending upwardly, and center pillar portions extending upwardly; ground engaging members supporting the frame; a cab comprising: a front seating section, generally positioned longitudinally between the front pillar portions and center pillar portions, and further comprising a front floor; and a rear seating section, generally positioned longitudinally between the center pillar portions and rear pillar portions, and further comprising a rear floor; a panel portion enclosing each of the center pillar portions; and front doors and at least one hinge per door, the hinges being coupled to the center pillar portions through lateral outer surfaces of the panel portions.

BRIEF DESCRIPTION OF THE DRAWINGS

FIG. 28 shows an exploded view of the vehicle side panels;

FIG. 29 shows a right rear perspective view of the passenger entry for the rear seating area;

FIG. 30 shows an enlarged view of the vehicle frame showing the architecture allowing the ingress for the rear passengers; and FIG. 31 shows a rider in the rear seat with the increased foot space and enlarged area for ingress.

DETAILED DESCRIPTION OF THE DRAWINGS

Figure 1:
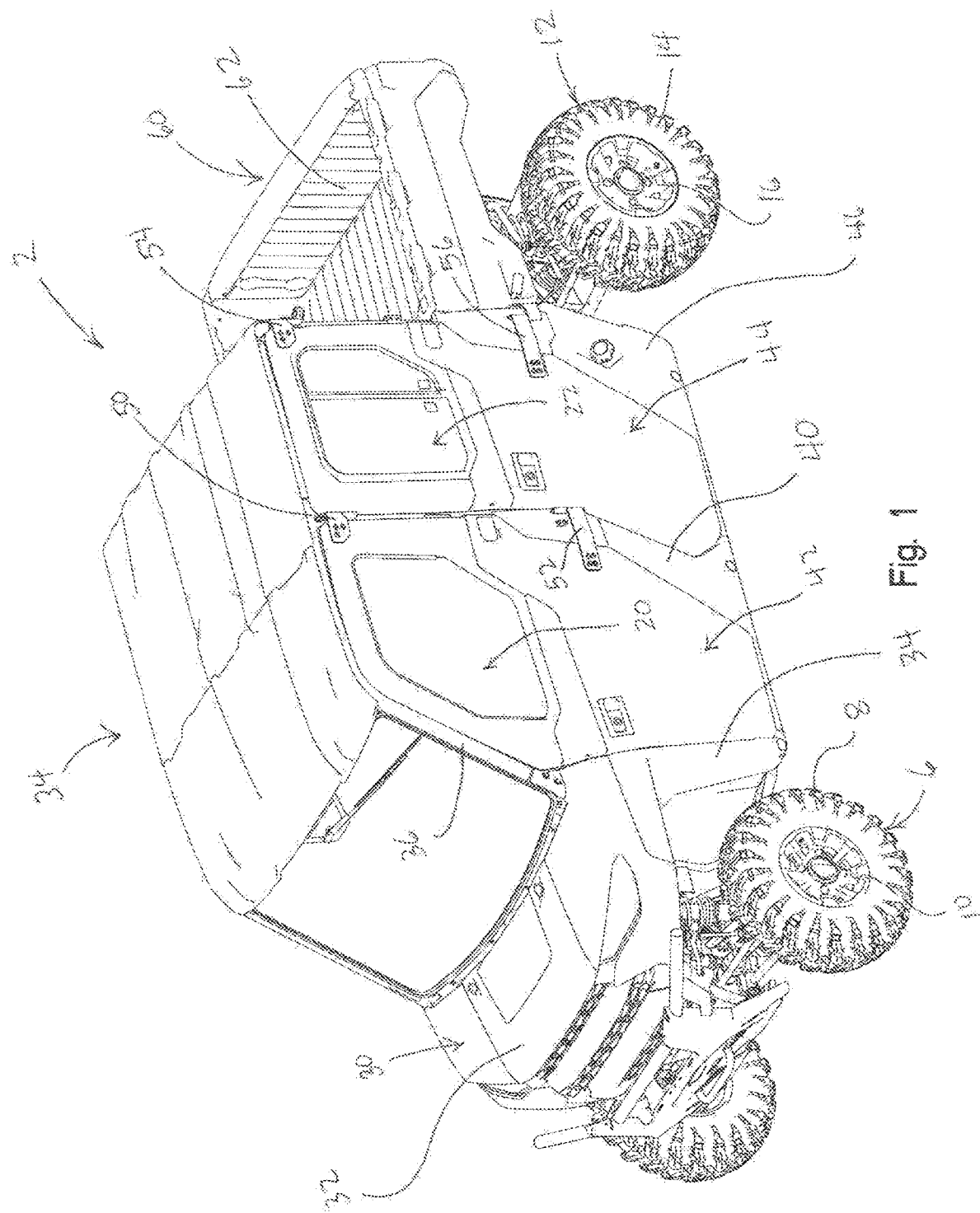
FIG. 1 is a front left perspective view of the vehicle of the present disclosure.
Figure 2:
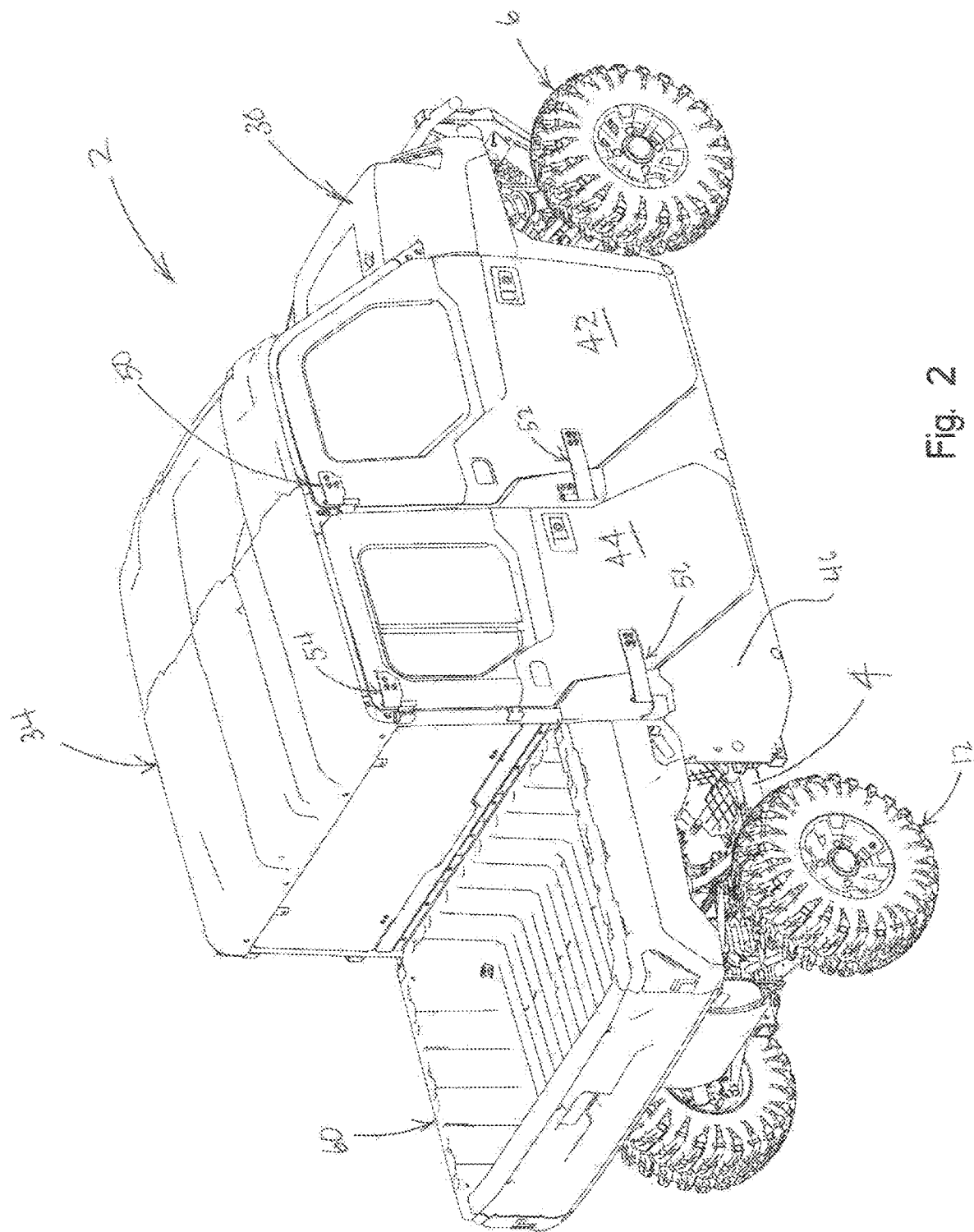
FIG. 2 is a right rear perspective view of the vehicle of the present disclosure.
Figure 3:
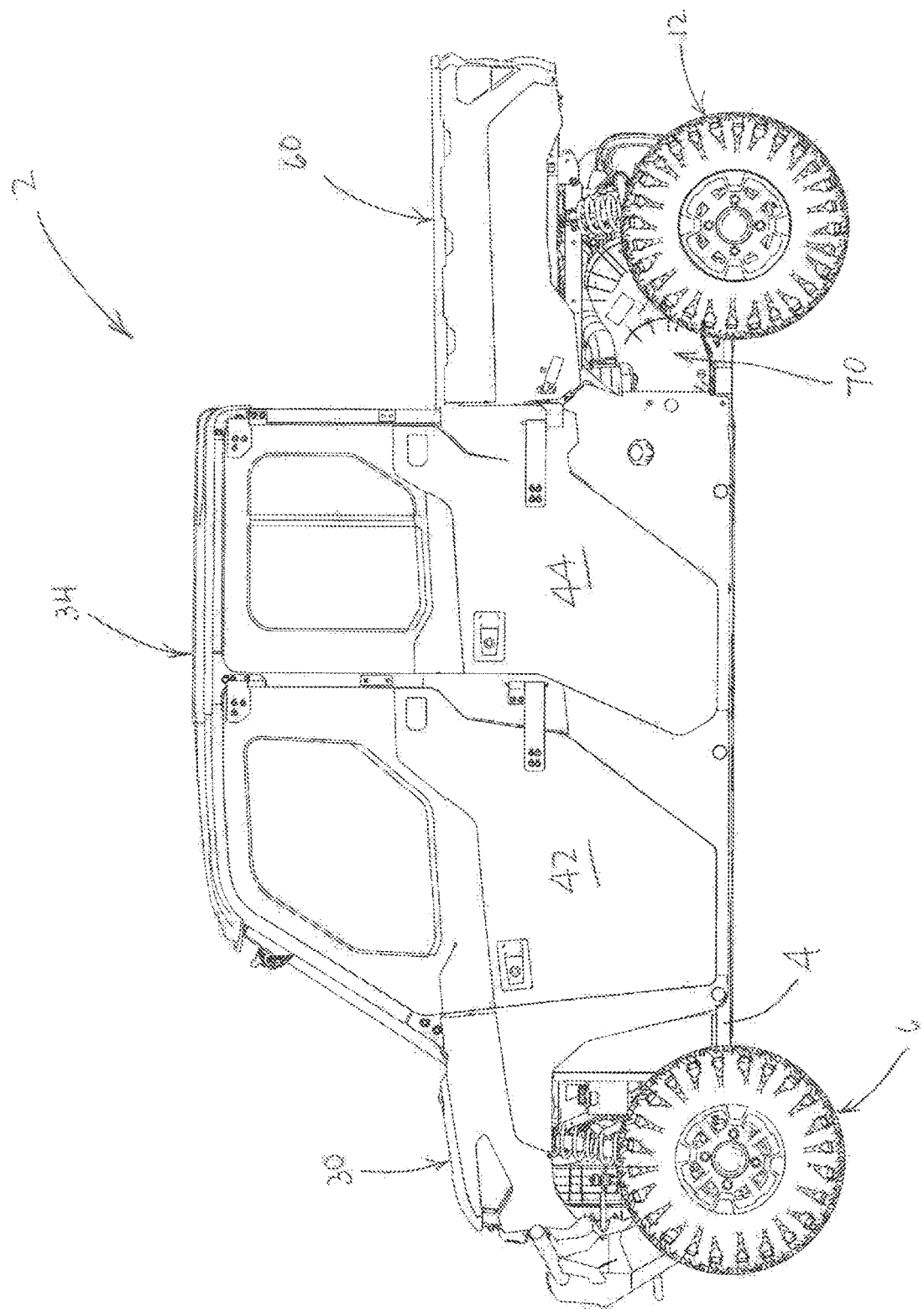
FIG. 3 is a left side view of the vehicle of FIG. 1.
Figure 4:
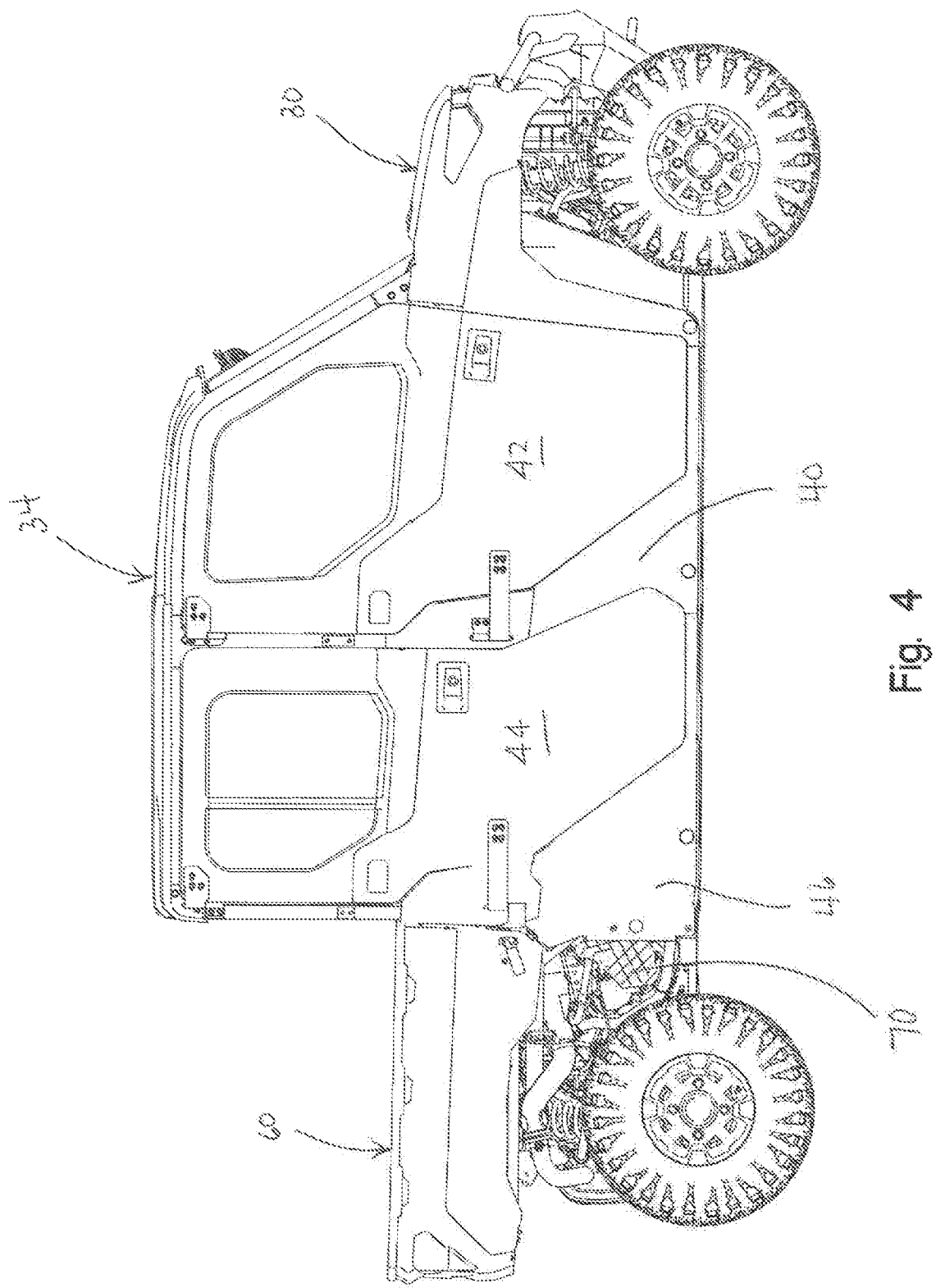
FIG. 4 is a right side view of the vehicle of FIG. 1.
Figure 5:
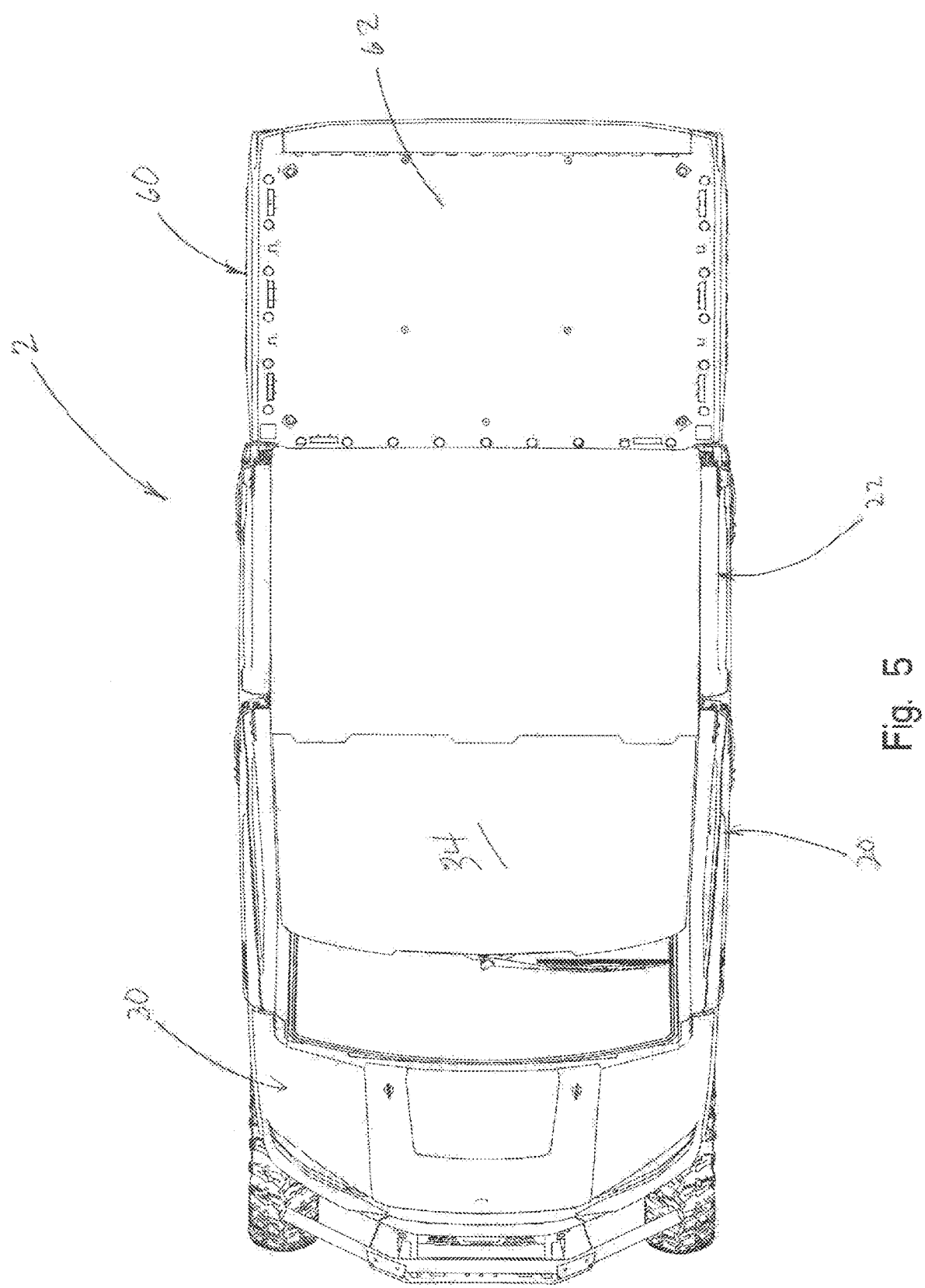
FIG. 5 is a top view of the vehicle of FIG. 1.
Figure 6:
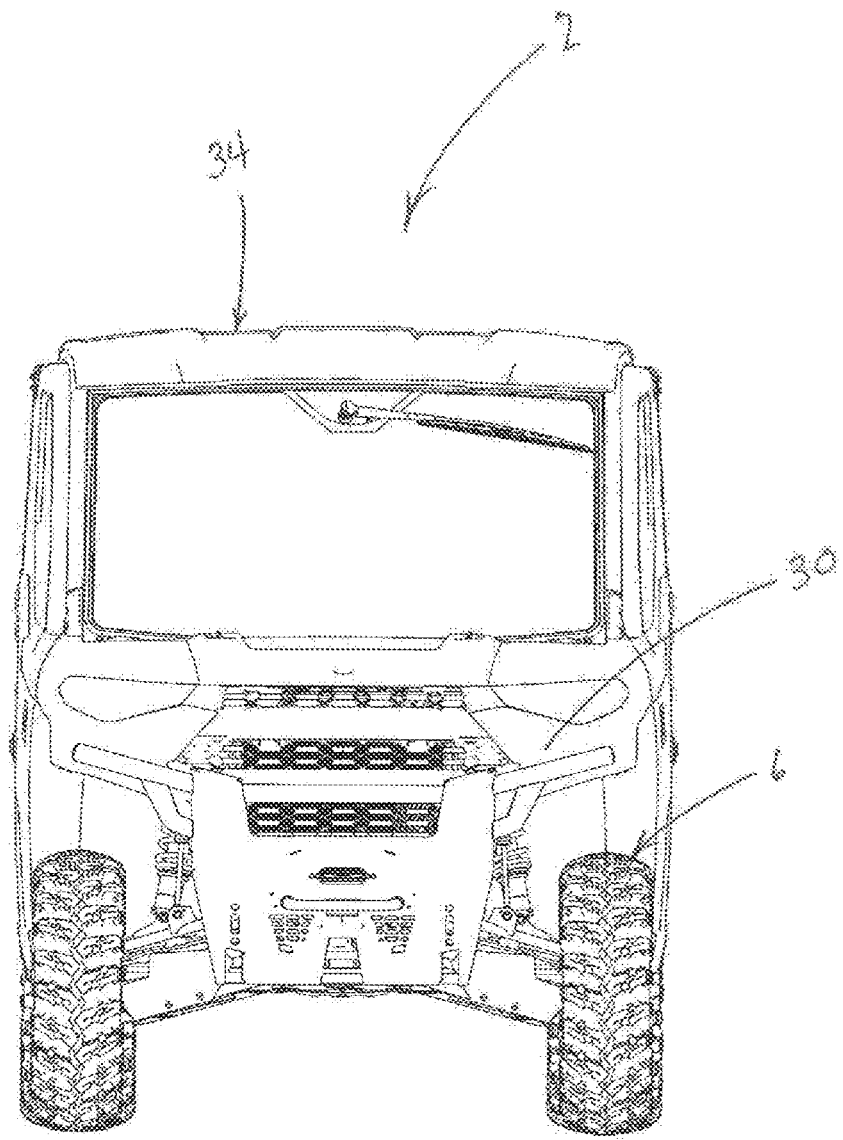
FIG. 6 is a front view of the vehicle of FIG. 1.
Figure 7:
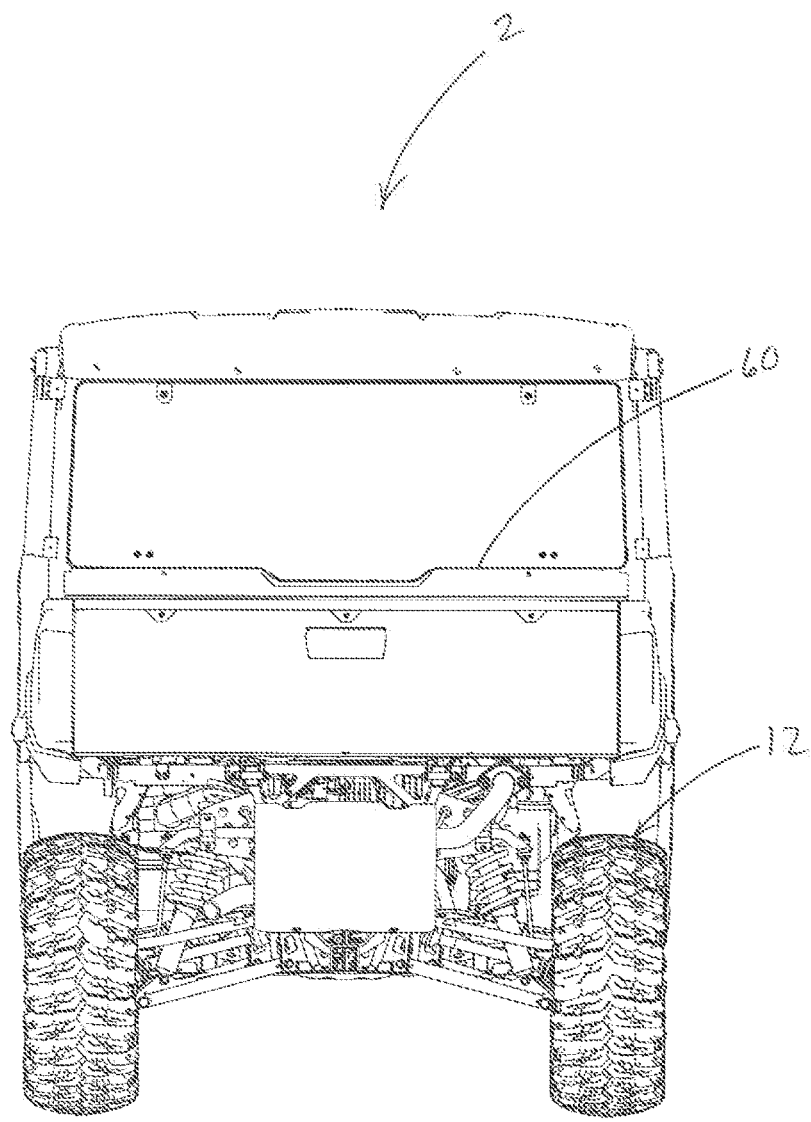
FIG. 7 is a rear view of the vehicle of FIG. 1.

With reference first to FIGS. 1-7, a utility vehicle is shown generally at 2 comprising a frame 4 (FIG. 2), front ground engaging members 6 defined by tires 8 and rims 10, and rear ground engaging members 12 defined by tires 14 and rims 16. The utility vehicle shown in FIG. 1 is generally referred to as a "crew" type utility vehicle having a front operator and passenger area 20 and a rear passenger area 22. Vehicle 2 includes a front 30 having a hood 32 and side panels 34. A roof 34 may be provided as a covering for the vehicle which couples to the vehicle cab frame 36, as in known in the art. The vehicle includes side panels at 40 intermediate a front door 42 and rear door 44 and rear panel 46 rearward of door 44. Door 42 is coupled to vehicle by way of an upper hinge 50 and lower hinge 52 while door 44 is coupled to vehicle by way of a hinge 54 and 56. Vehicle 2 may also include a rear body area 60 which may include a utility bed 62 configured as a dump body. As best shown in FIGS. 3 and 4, vehicle 2 also includes a powertrain 70, as further described herein.

Figure 8:
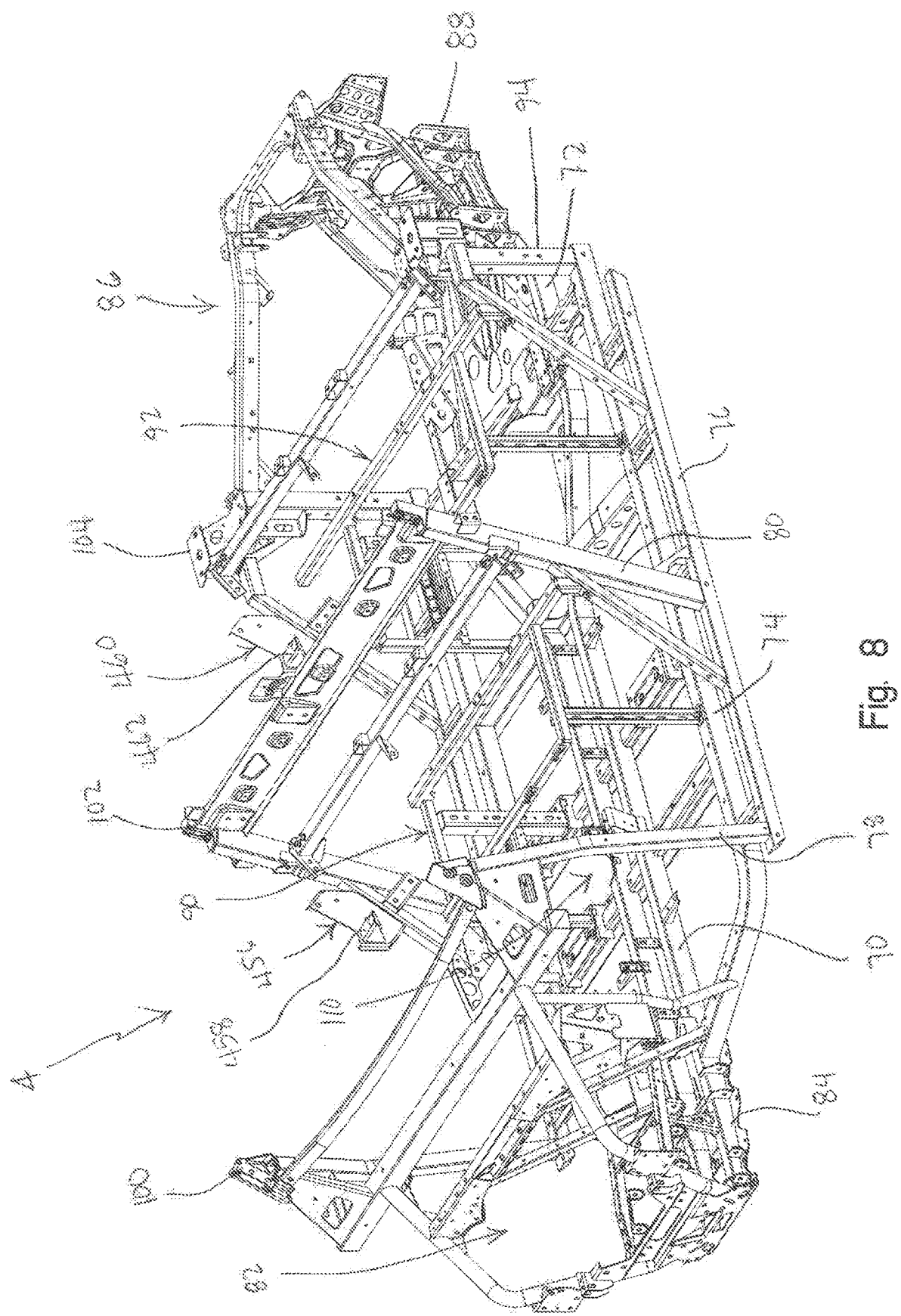
FIG. 8 is a front left perspective view of the frame for the vehicle of FIG. 1.
Figure 9:
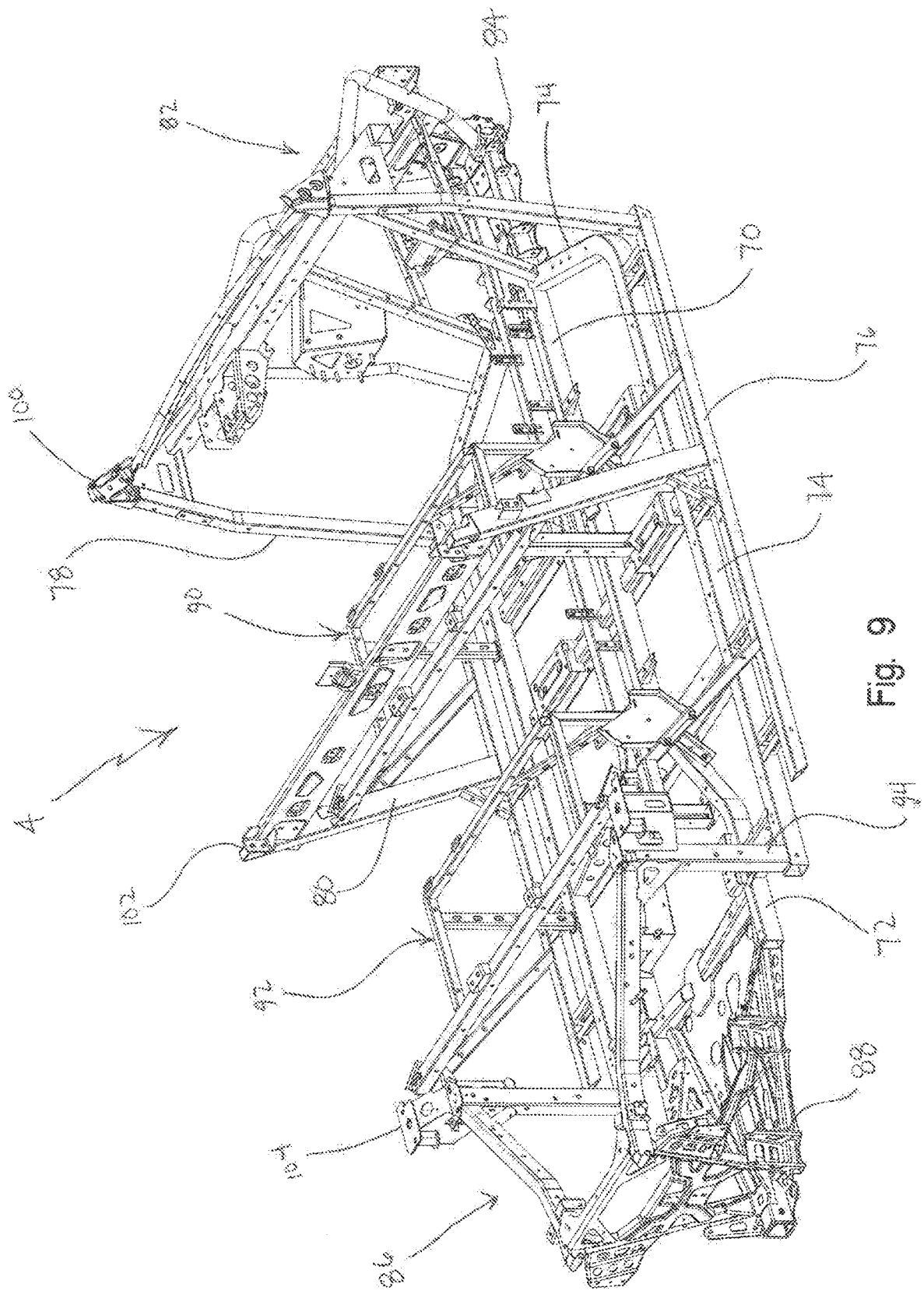
FIG. 9 is a right rear perspective view of the frame of FIG. 8.

With reference now to FIGS. 8 and 9, frame 4 will be described in greater detail. As shown, frame 4 is defined by longitudinally extending frame tubes 70 extending from the front of the frame to a rear of the frame where frame tubes 70 expand outwardly to define sections 72. Outer tubes 74 couple to frames 70 and extend rearwardly from a front end of tubes 70. Tubes 76 run parallel to tubes 74 and include upright portions or pillars at 78 and 80. Frame 4 defines a front frame portion 82 which includes a front suspension mount portion at 84 and a rear frame portion 86 defining a rear suspension mount portion at 88. Frame 4 includes a front seat mount portion 90 and a rear seat mount portion 92. Frame 4 also includes upright portions or pillars 94 extending upwardly from frame tubes 74. Cab frame mount portions are defined by front cab frame mount portions 100, mid cab frame mount portions 102 and rear cab frame mount portions 104. A drive shaft carrier bearing mount portion 110 is defined in the longitudinally extending frame tubes 70 adjacent to seat portion 90, as described further herein.

With reference now to FIGS. 10-13, a heating, ventilation and air conditioning (HVAC) system 120 will be described in greater detail. As shown, HVAC system 120 includes a compressor 122 which is driven by engine 124 in a manner similar to that described in U.S. Pat. No. 9,738,134, the subject matter of which is incorporated herein by reference. Compressor 122 is for compressing refrigerant of the air conditioning portion of HVAC system 120, as is known in the art. HVAC system 120 further includes a condenser 130, which corresponds with an HVAC unit 132 located within the operator's compartment 20, as further described herein. HVAC unit 132 having a heater core 134 and an evaporator 136 positioned therein. While not part of the HVAC system per se, a radiator 140 is mounted rearwardly of the condenser 130 where both the condenser 130 and radiator 140 are positioned forward in the vehicle mounted within front section 82 (FIG. 8), so as to receive air across the condenser 130 and radiator 140 for cooling purposes.

Figure 12:
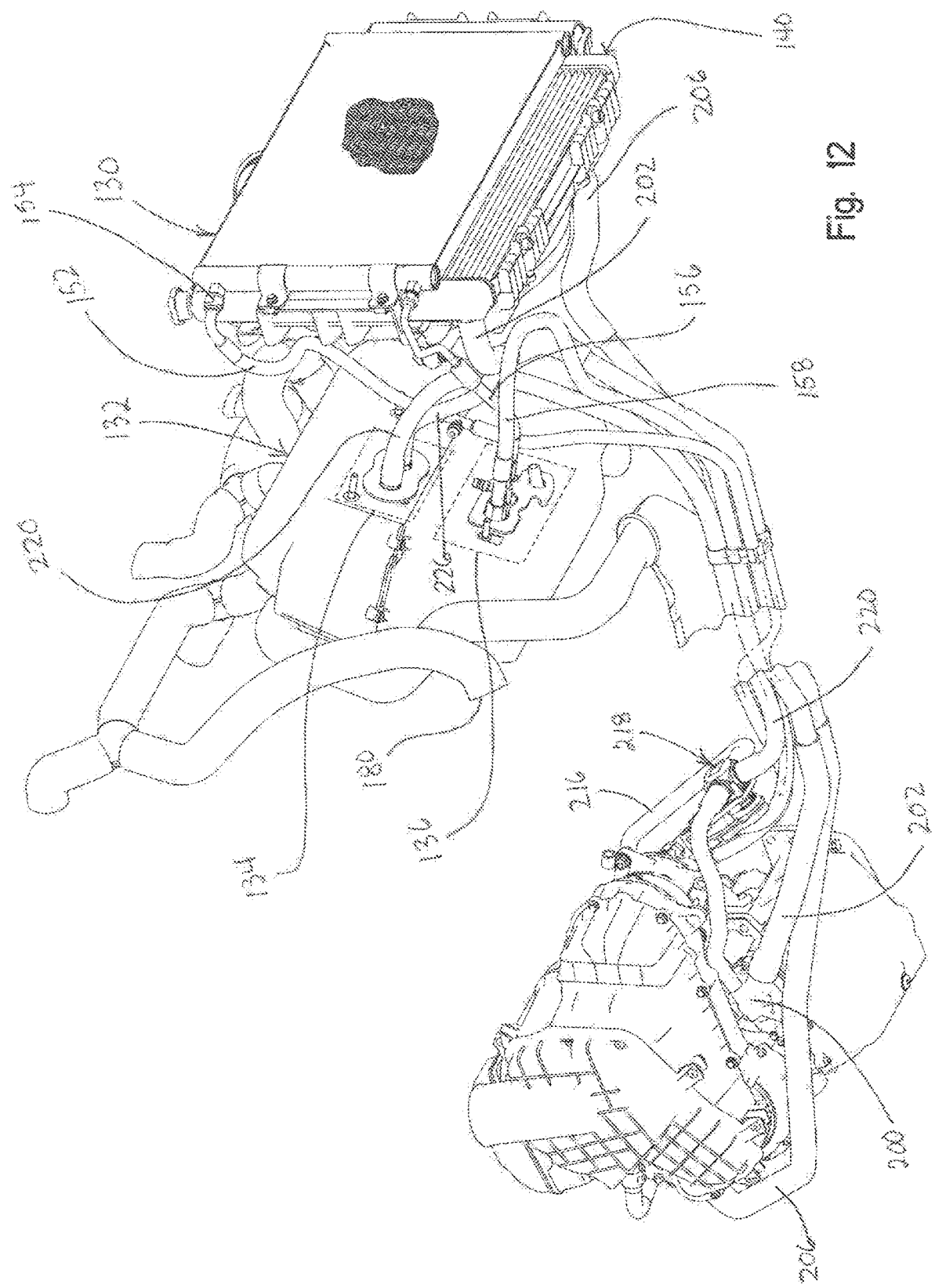
FIG. 12 shows a right front perspective view of the HVAC system, with the system hoses partially broken away.
Figure 13:
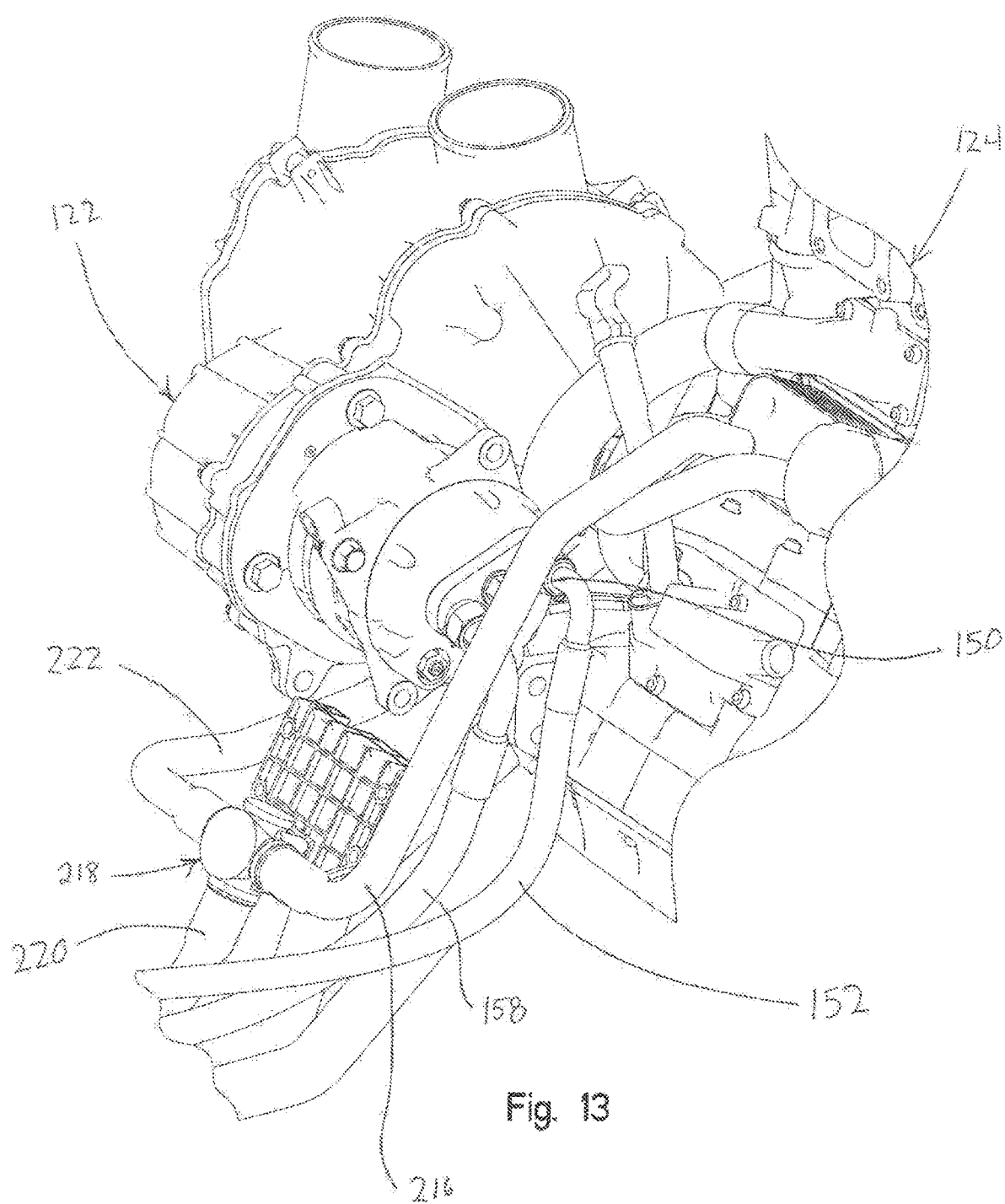
FIG. 13 is an enlarged view of the engine driven air conditioning compressor of the HVAC system.

With reference now to FIGS. 12 and 13, the routing of the refrigerant will be described in detail. A fitting 150 of hose 152 (FIG. 13) is coupled to compressor 122 which provides compressed refrigerant through fitting 154 (FIG. 12) to condenser 130. Refrigerant is cooled by the condenser and travels downwardly in condenser 130. A hose 156 (FIG. 12) provides refrigerant from the condenser 130 to the evaporator 136 whereupon a hose 158 returns the refrigerant back to the compressor 122, as shown in FIG. 13. This is the continuous refrigeration cycle where air is treated within HVAC unit 132 and is provided to various output ducts at 160, 162 and 164 (FIG. 10) to deliver treated air through duct outlets 166, 168, 170, 172, 174, 176, 178 and 180 (FIG. 12). It should be appreciated that ducts 160, 162 and 164 are for the front compartment 20. A rear duct assembly 184 (FIG. 10) is coupled to a rear duct 186 (FIG. 11) which extends outwardly from HVAC unit 132, and which connects to a low profile duct 188, to a Y-shaped connector 190 (FIGS. 10 and 11) and then to rear ducts 192, as described in great detail herein.

Figure 10:
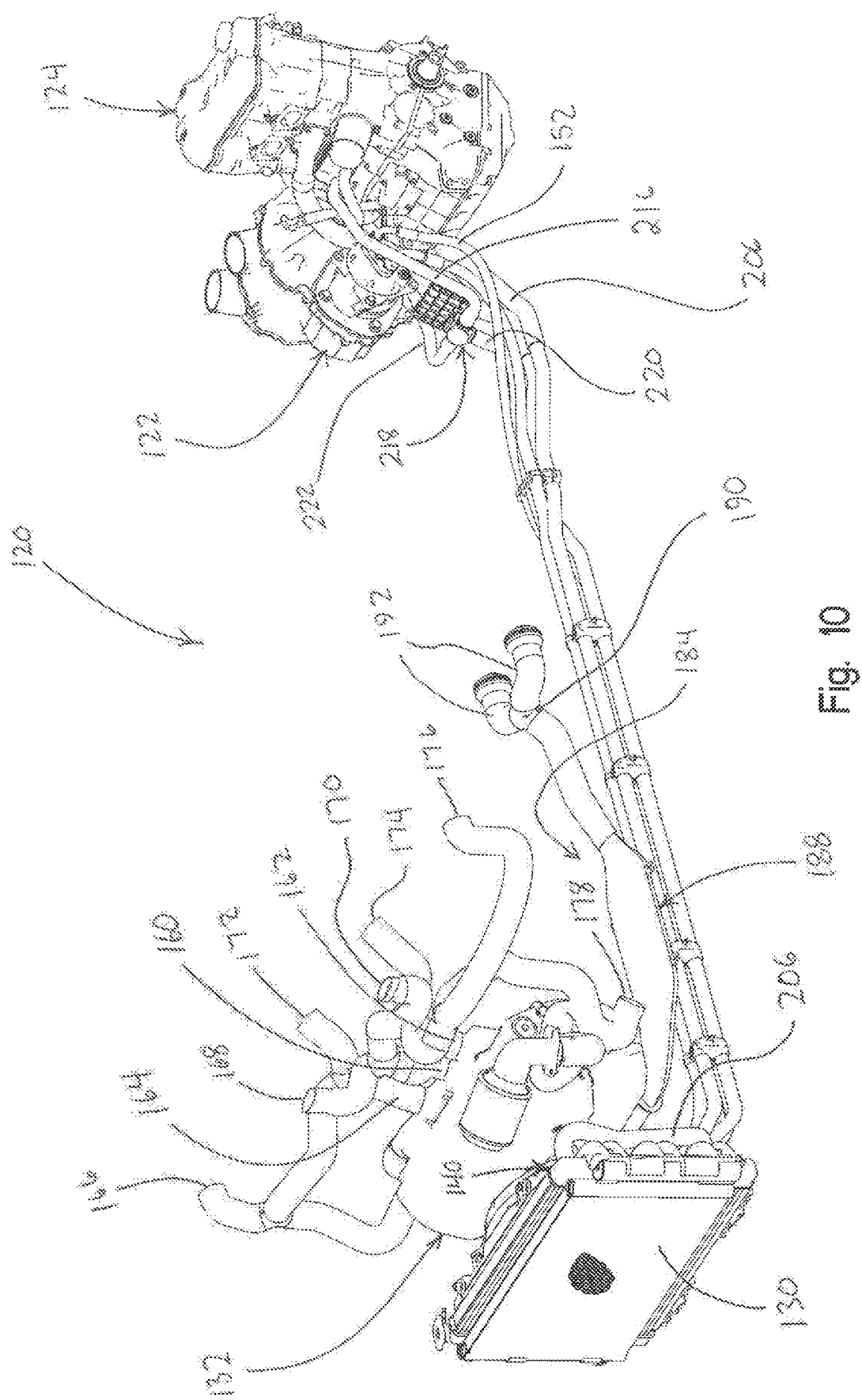
FIG. 10 is a front left perspective view showing the components for a vehicle heating, ventilation and air conditioning (HVAC) system.
Figure 11:
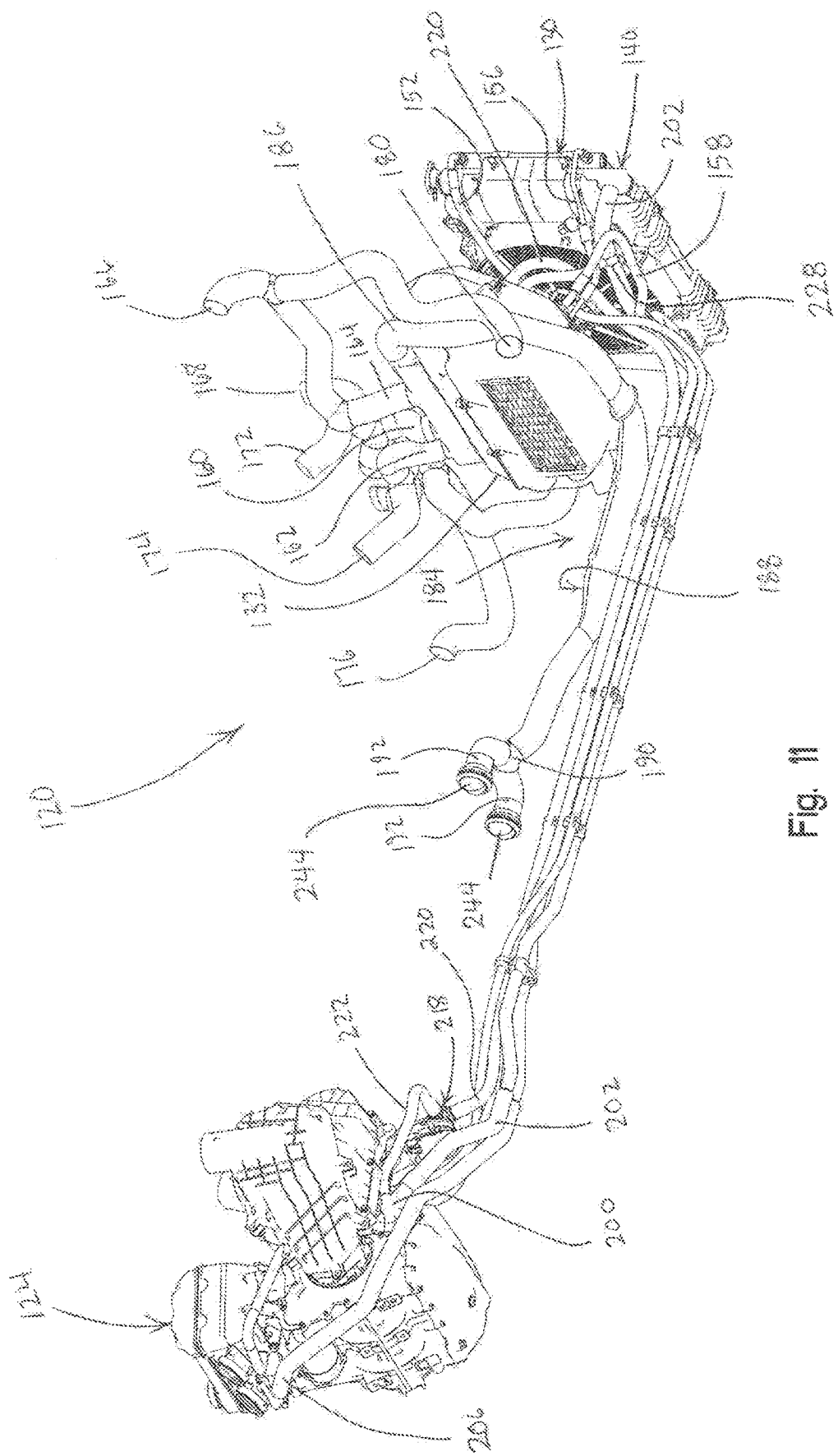
FIG. 11 shows a right rear perspective view of the components of the HVAC system.

The heating portion of the HVAC system utilizes heat taken from the engine cooling water. The engine cooling water is pumped by way of a water pump 200 (FIG. 11) through hose 202 from radiator 140. Water pump 200 pumps water upwardly through engine 124 whereupon heated water exits through hose 206. Heated water returns to the radiator 140 by way of hose 206, as best shown in FIG. 10. Heated water for the heater core 134 is taken from engine 124 through hose 216 (FIG. 13) into a thermostatic valve 218 and into hose 220. If the water is not heated enough for the heater core 136 then the water returns to the engine through hose 222. Hose 220 goes into the heater core 134, as shown best in FIG. 12. Heat is extracted from the water and utilized for heating purposes in the HVAC unit 132. Water exits the heater core at hose 226 (FIG. 12) where it couples to hose 202 at fitting 228 (FIG. 11) whereupon it returns to the engine.

Figure 14:
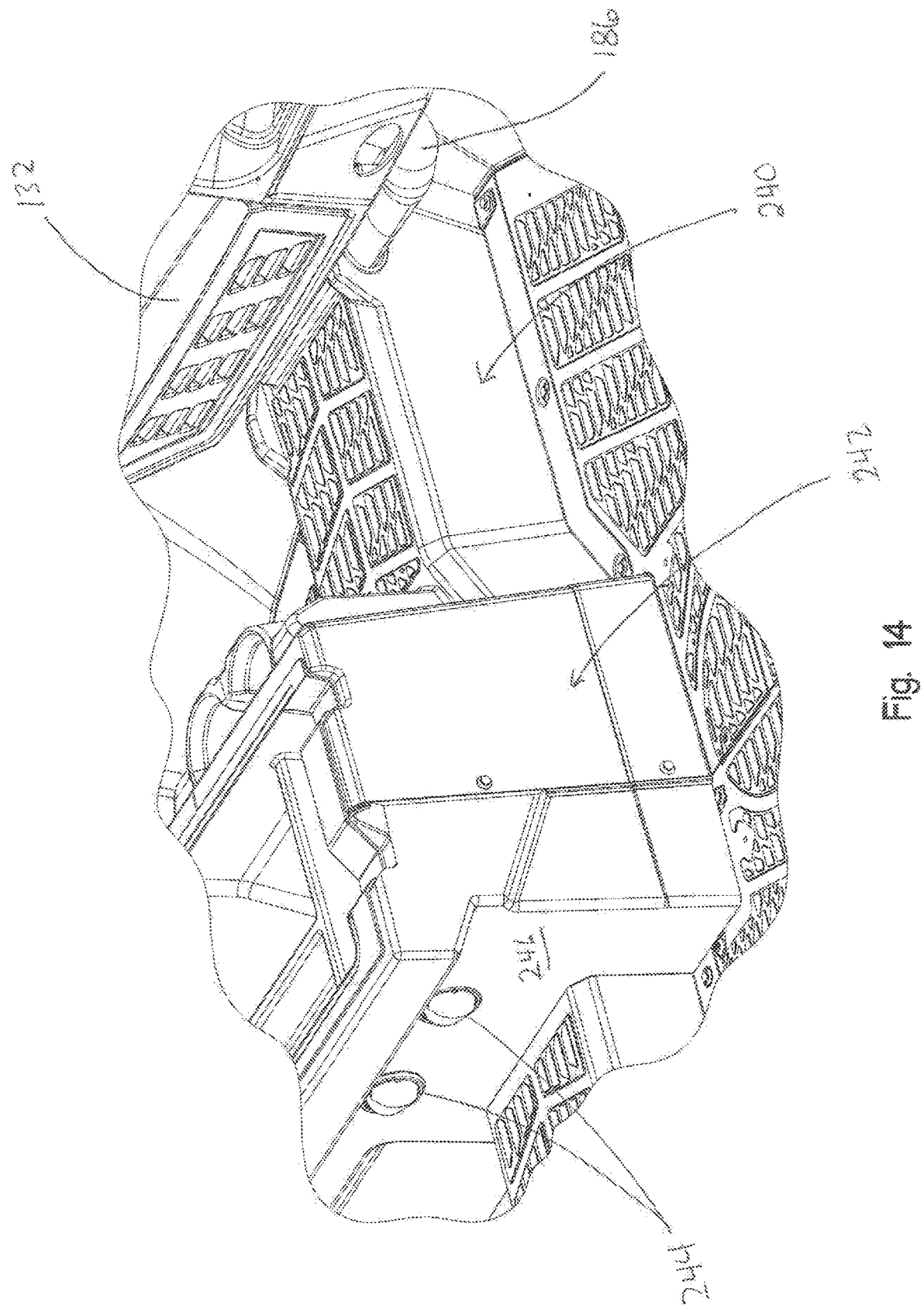
FIG. 14 shows a right rear perspective view of the operator's compartment showing treated air vents for the rear passengers.
Figure 16:
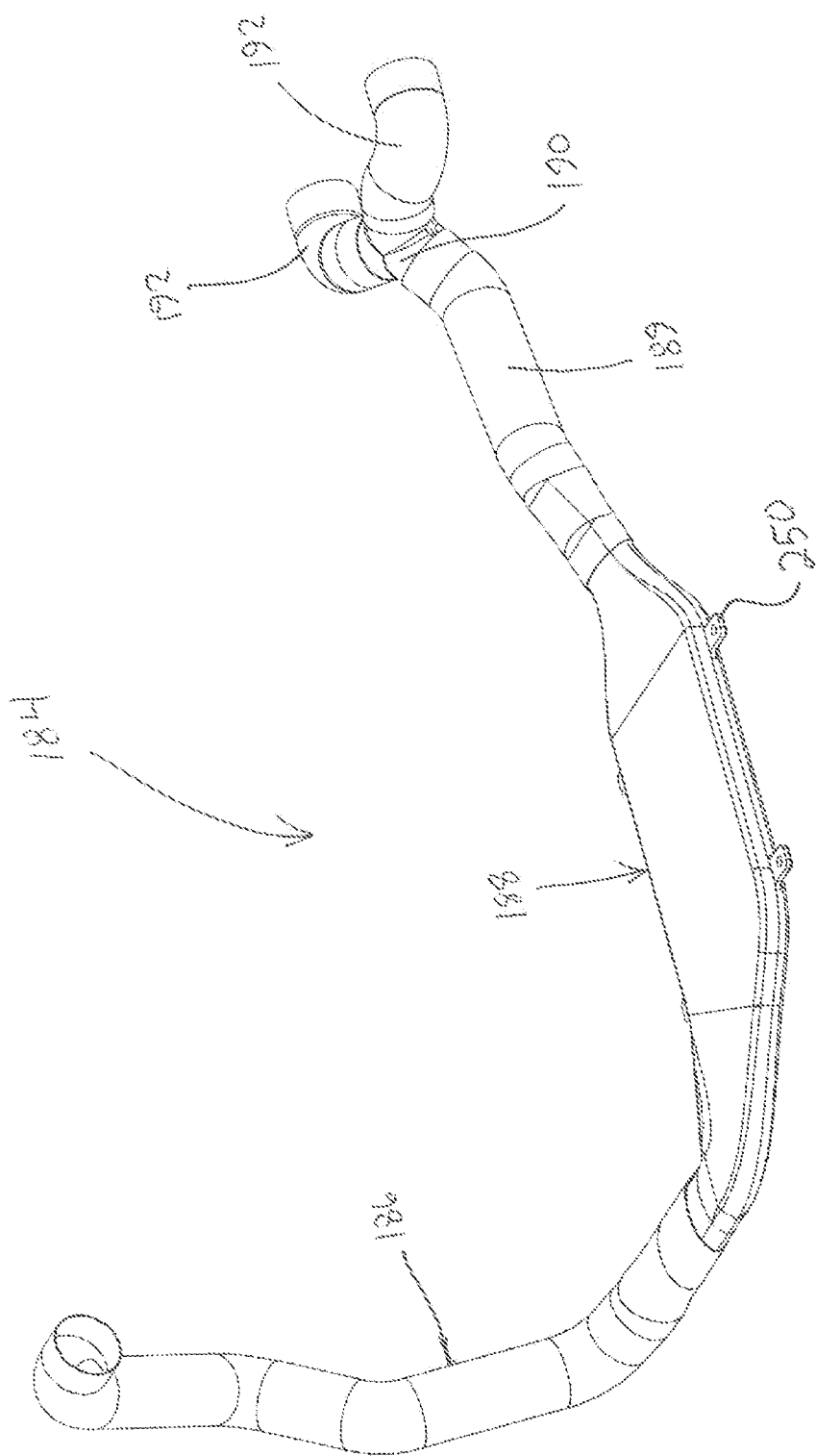
FIG. 16 is an enlarged view of the low profile duct shown in FIG. 15.

Given the architecture of the HVAC system 120 as described above, the application of the HVAC system into the vehicle 2 will be described. With reference first to FIG. 14, HVAC unit 132 is shown placed in the front of the vehicle with hose 186 extending into a tunnel portion 240. Tunnel portion 240 extends rearwardly to a pedestal 242 which covers the front seat frame 90 (FIG. 8). Rear vents 244 are coupled to a rear wall 246 of pedestal 242 and project rearwardly from pedestal 242 and communicate with rear passenger compartment 22 (FIG. 1). As shown best in FIGS. 16 and 17, rear duct assembly 184 is comprised of hose 186, low profile duct 188, hose 189, Y-splitter 190 and ducts 192. Ducts 192 communicate treated air through vents 244 to the rear compartment 22.

Figure 15:
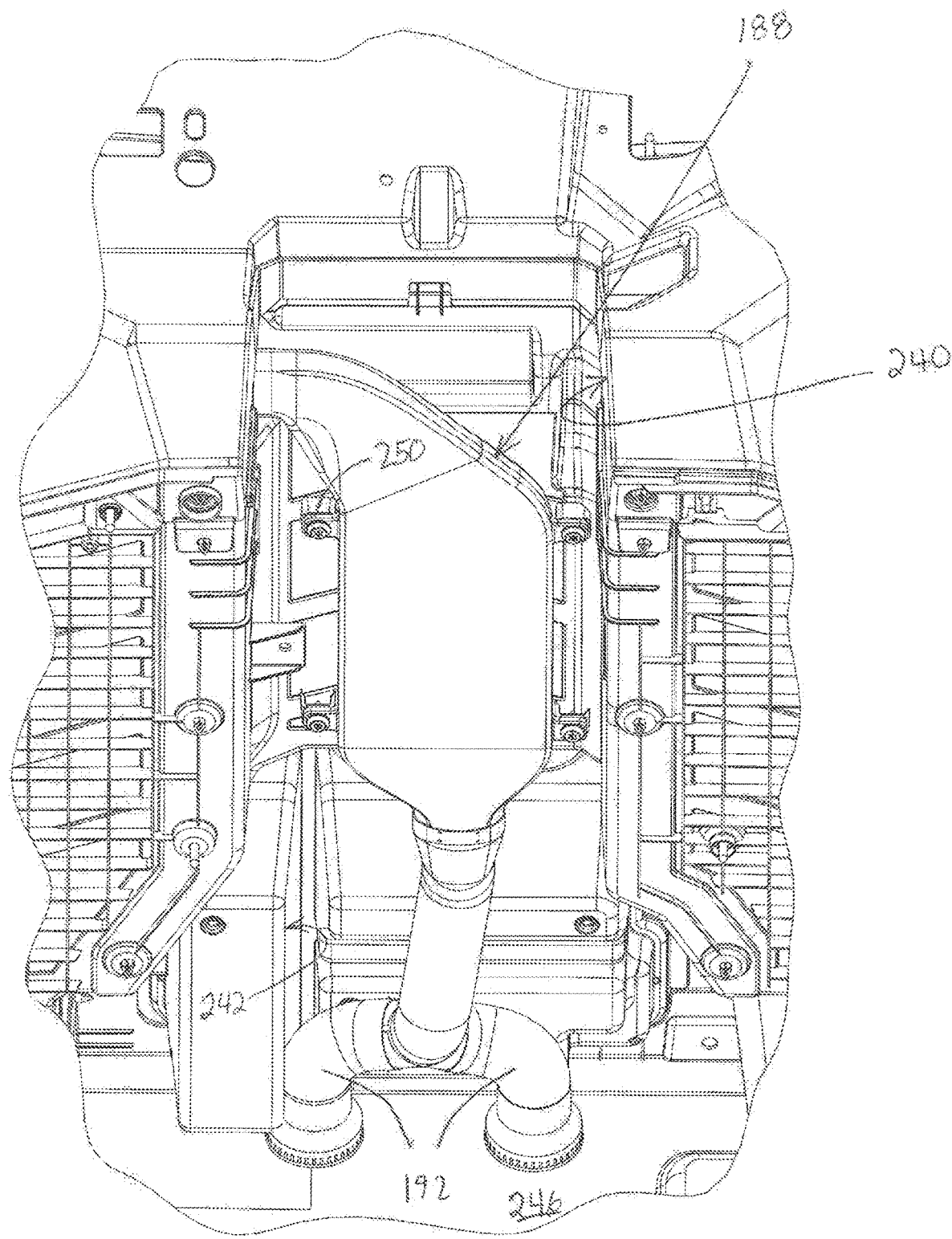
FIG. 15 is an underside rearward looking perspective view showing the duct for delivering the treated air to the rear passengers.
Figure 17:
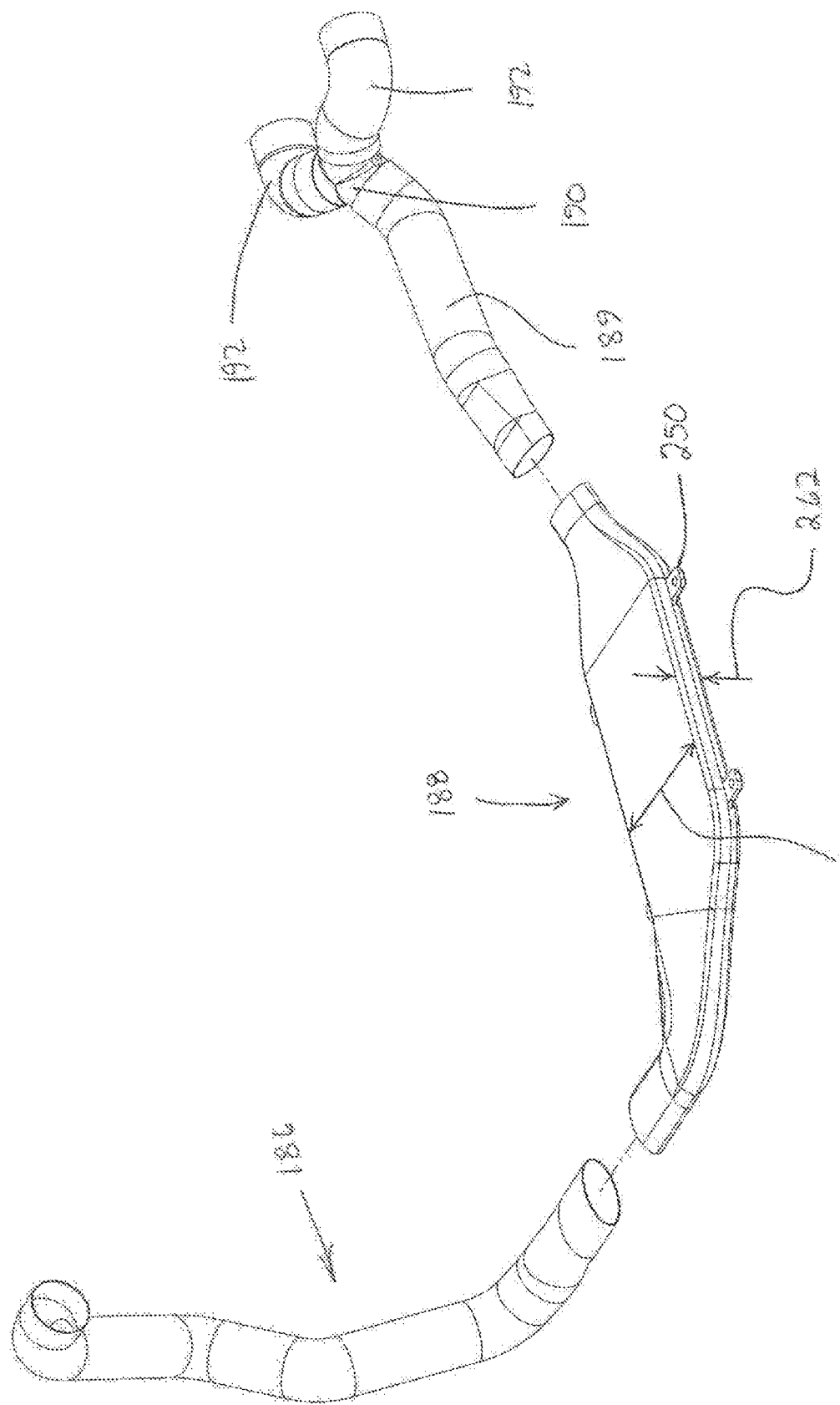
FIG. 17 is an exploded view of the duct of FIG. 16.

As shown in FIG. 17, low profile duct 188 includes mounting ears 250 for mounting duct 188 on an underside of tunnel 240, as best shown in FIG. 15. Due to the low profile nature of duct 188, tunnel 240 can be kept to a minimum height maximizing the front area of compartment 20, for example for a rider's feet. As shown in FIG. 17, low profile duct 188 has a central width of 260 and a height of 262. In the embodiment shown, dimension 260=150 mm (5.9 inches) and dimension 262=22 mm (0.866 inches) such that a ratio of the width to the height (260/262)=6.8, however the ratio could be in a range of 5-10.

Figure 18:
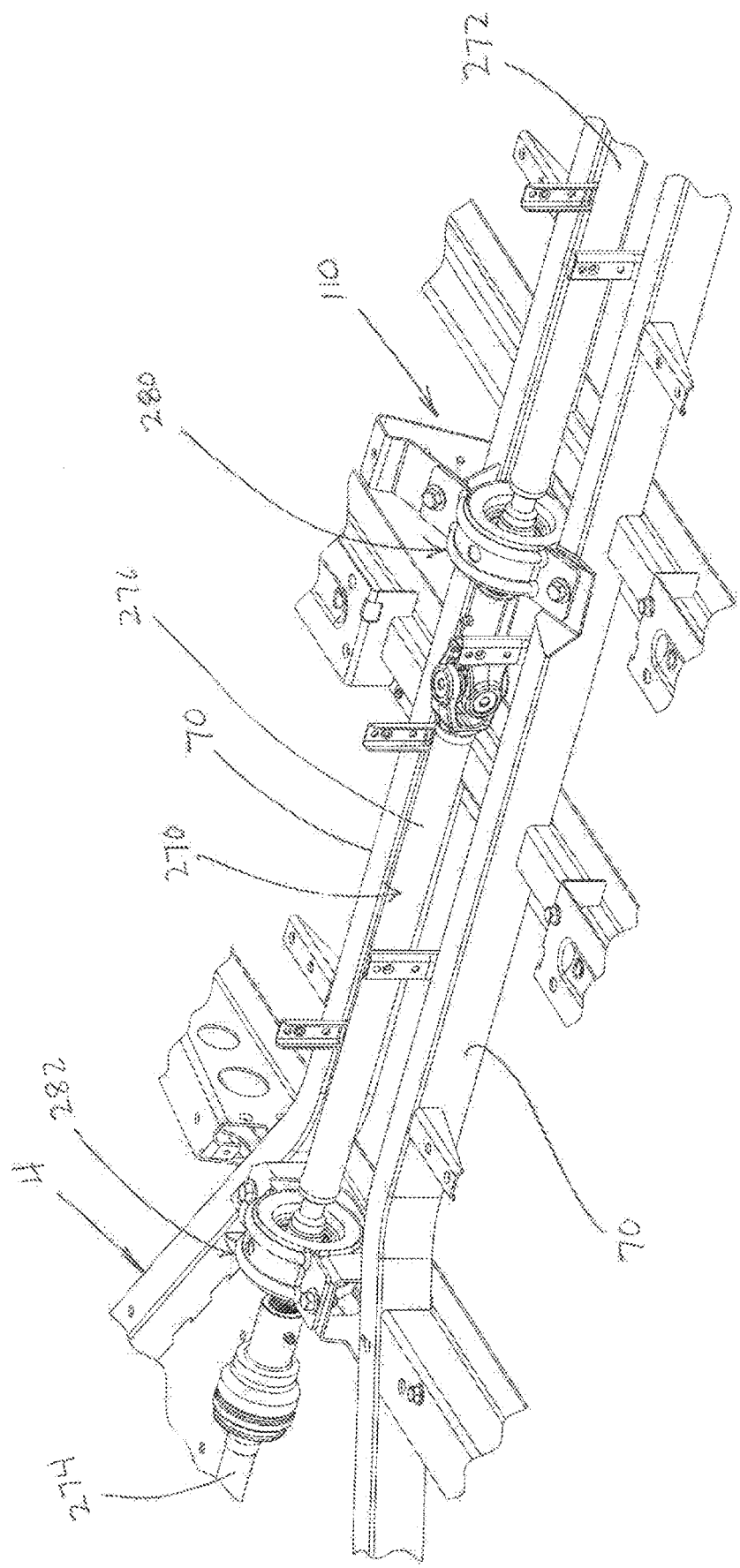
FIG. 18 shows a front right perspective view of the drive train prop shaft of the vehicle of FIG. 1.
Figure 19:
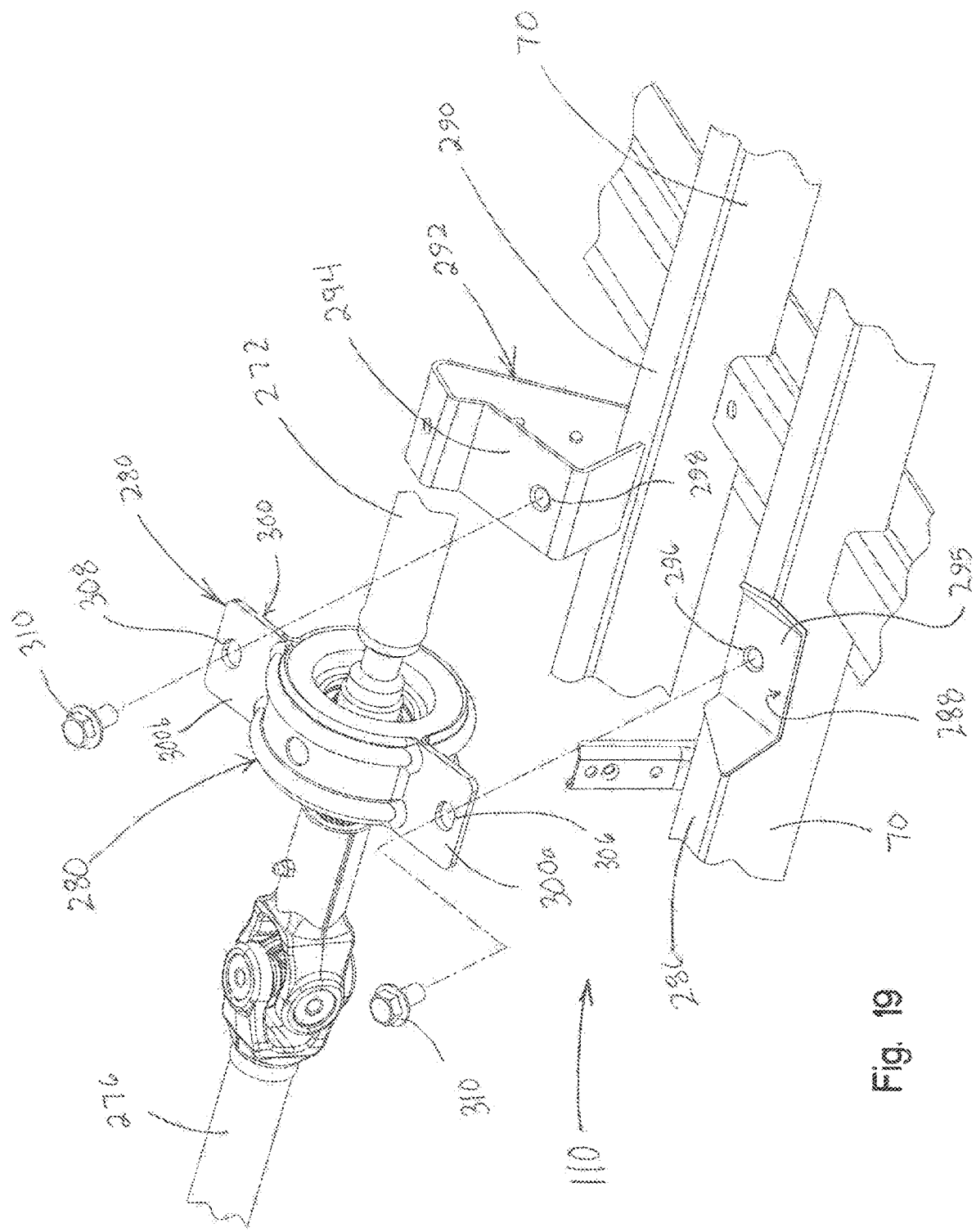
FIG. 19 shows the prop shaft and bearing carrier exploded from the frame.
Figure 20:
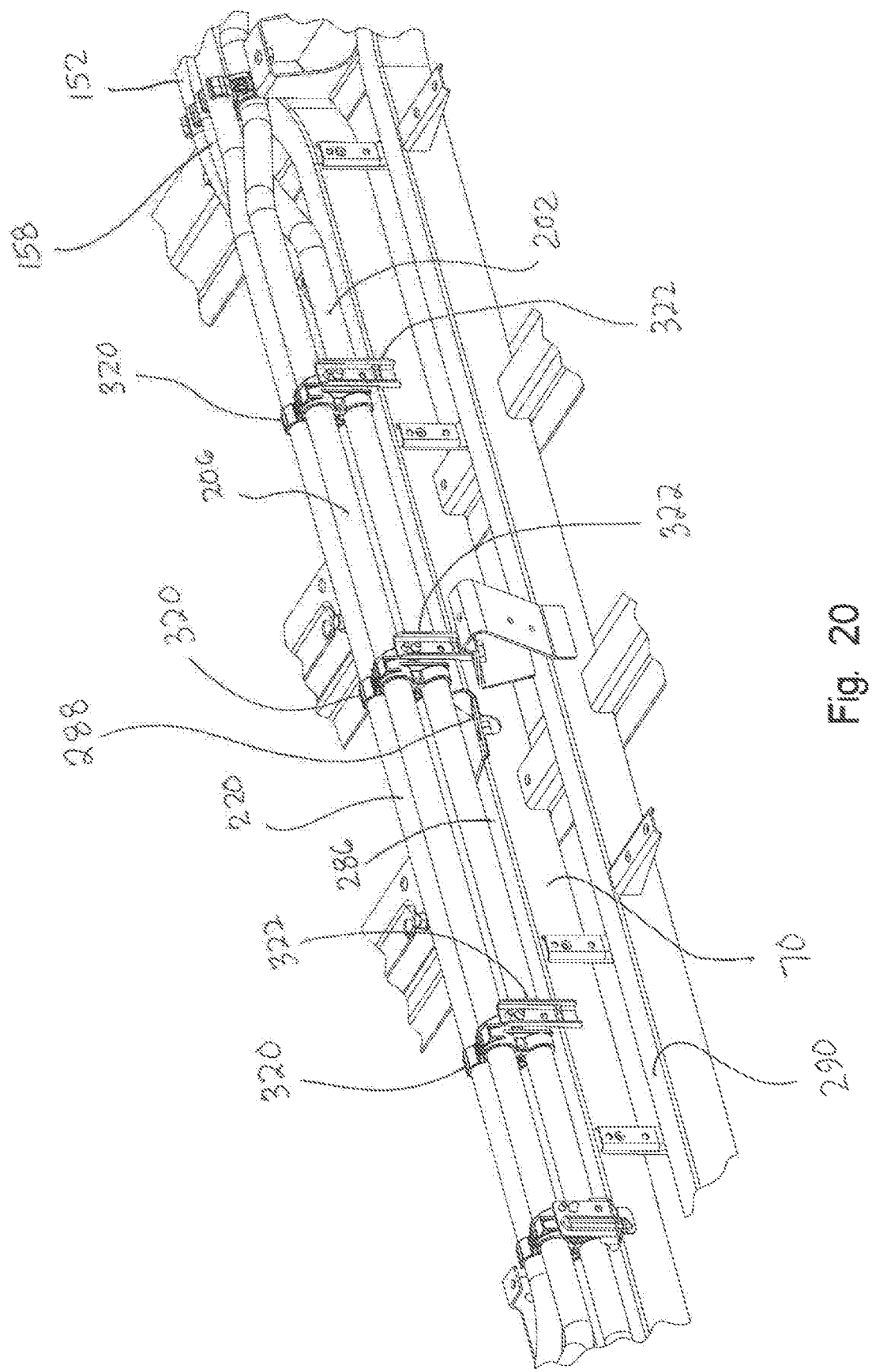
FIG. 20 shows the HVAC hoses coupled to the frame.

With reference now to FIGS. 18-20, a revised drive line will be described that allows for compact packaging of the HVAC hoses described above. With reference first to FIG. 18, a drive shaft 270 is shown having a front drive shaft portion 272 which would power front wheels 6 and a rear drive shaft portion 274 which would power rear wheels 12. A center drive shaft portion 276 extends intermediate drive shaft portions 272 and 274 and is supported by carrier bearings, namely a front bearing carrier 280 and a rear bearing carrier 282.

With reference now to FIG. 19, frame 4 was redesigned such that one frame tube 70 is provided with an upper surface 286 where a reduced height section 288 is defined, which as shown, is defined by a notch within frame member 70. The other frame member 70 provides an upper surface 290 which includes mounting portion 292 raised relative to the upper surface 290. Mounting portion 292 is defined by a bracket having a mounting surface at 294 which is parallel to surface 295 defined by notch 288. Notch 288 and bracket 292 include threaded openings 296, 298 respectively, as described herein.

With reference still to FIG. 19, the drive shaft carrier bearing 280 includes outer flange 300 which includes a first flange portion 300a which may be received against surface 295 of notch 288 and a second flange portion 300b which is received on surface 294. Flange 300 includes an aperture 306 which aligns with threaded aperture 296 and aperture 308 which aligns with threaded aperture 298. Fasteners 310 are received through apertures 306, 308 and are threadably received in threaded openings 296, 298 respectively. As shown in FIG. 19, flange portions 300a and 300b are rotated relative to a horizontal axis and due to notch 288, the entirety of the flange portion 300a is below top surface 286 (FIG. 18). This provides for added volume within front tunnel portion 240 (FIG. 14) for mounting of the HVAC hoses.

More particularly, and with reference to FIG. 20, the HVAC hoses 152, 158, 202, 206 and 220 are shown bundled together by way of clamps 320 which then couple to upstanding posts 322 which attach to a side of the longitudinal frame tube 70 which include notch 288. This allows the bearing carrier 280 to be coupled to the frame tubes 70 yet allowing the hose bundle to be positioned in close proximity to upper surface 286 providing low profile packaging within tunnel 240.

Figure 21:
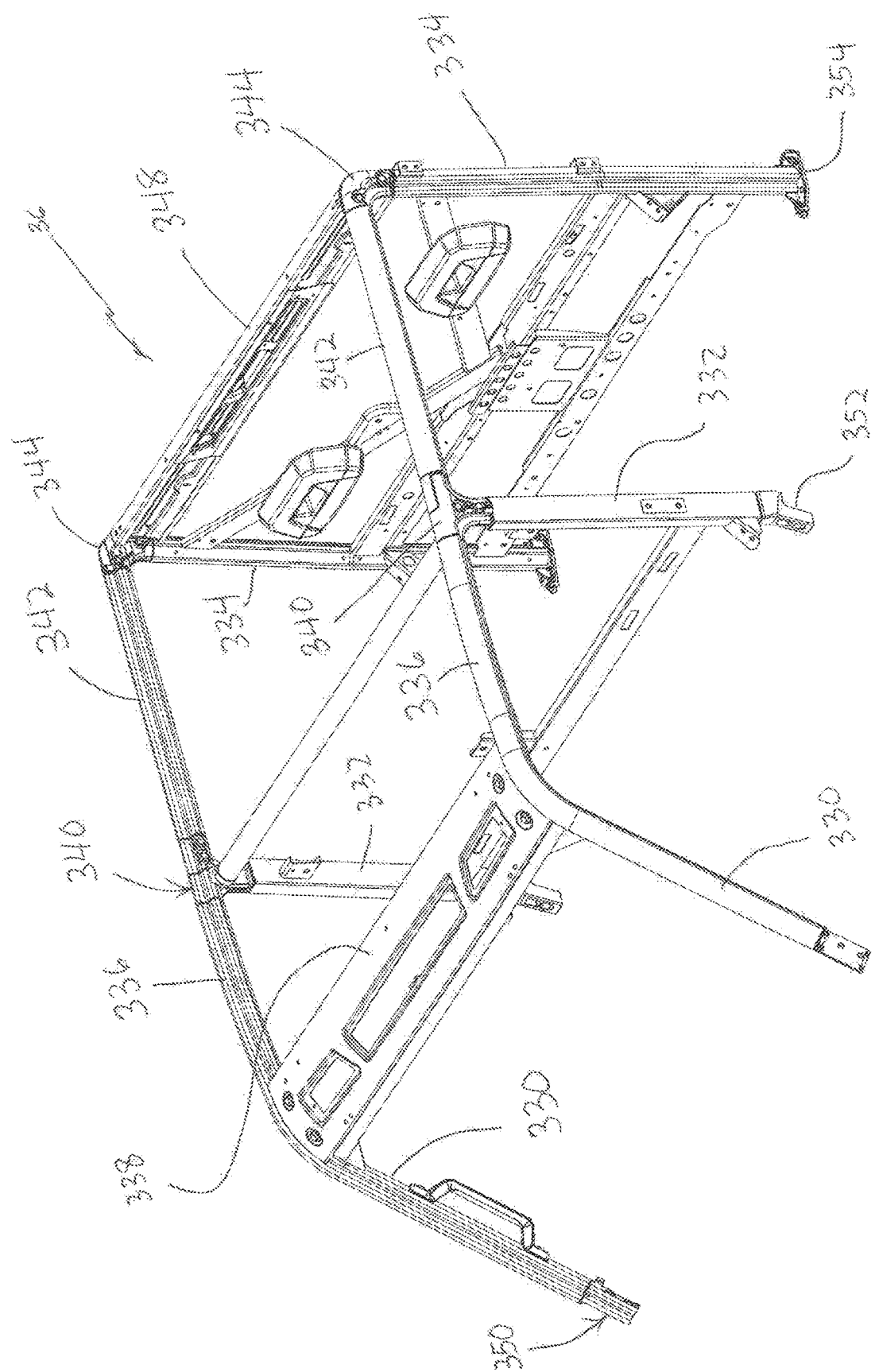
FIG. 21 shows a front left perspective view of the cab frame of the present vehicle.
Figure 22:
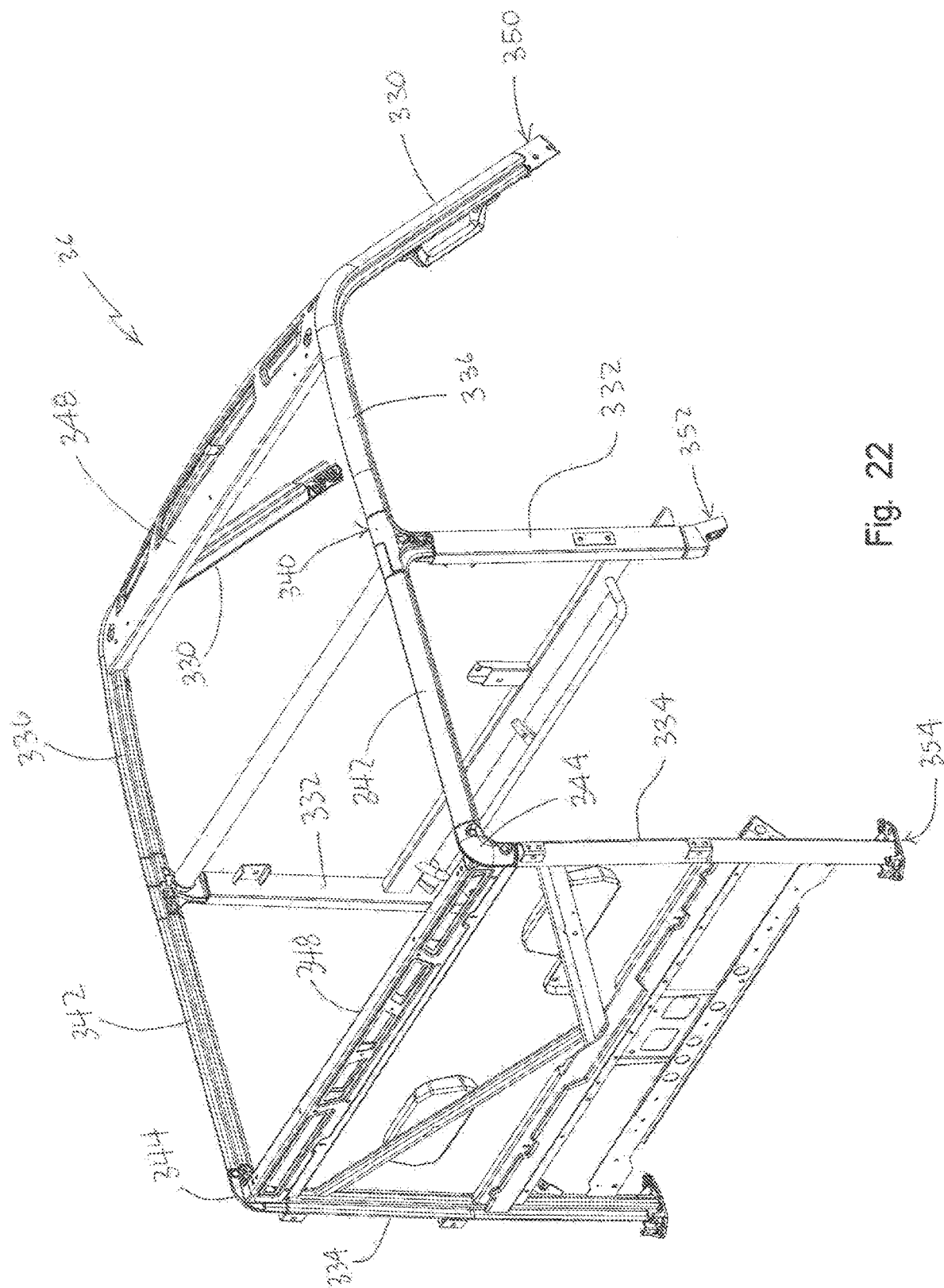
FIG. 22 shows a right rear perspective view of the cab frame of FIG. 21.

With reference now to FIGS. 21 and 22, cab frame 36 will be described in greater detail. As shown, cab frame 36 includes front uprights 330, center uprights 332 and rear uprights 334. Front uprights 330 include an integrated longitudinal section 336 with a transverse section 338 extending therebetween. T-shaped couplers 340 couple to a rear end of sections 336, an upper end of uprights 332, and a forward end of longitudinal sections 342. Angled couplers 344 are coupled to a rear end of sections 342 and upper ends of uprights 334. A transverse section 348 extends between couplers 344. Cab frame 36 is mounted to frame 4 by way of front couplers 350 which mount to front couplers 100 (FIG. 8), middle couplers 352 which mount to couplers 102 (FIG. 8) and rear couplers 354 which mount to couplers 104 (FIG. 8).

Figure 23:
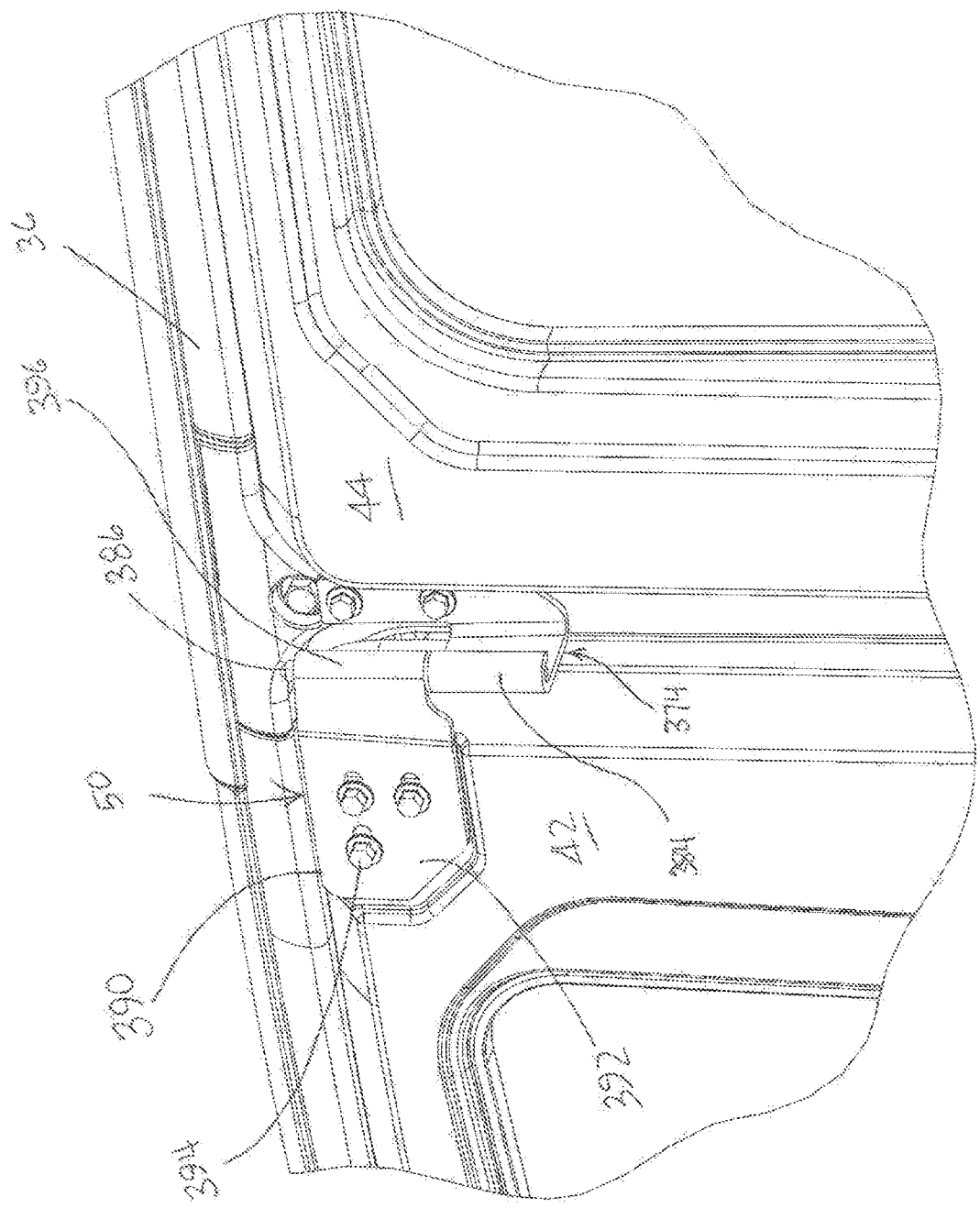
FIG. 23 shows an upper right-hand corner coupling of the driver door to the cab frame shown in FIGS. 21 and 22.
Figure 24:
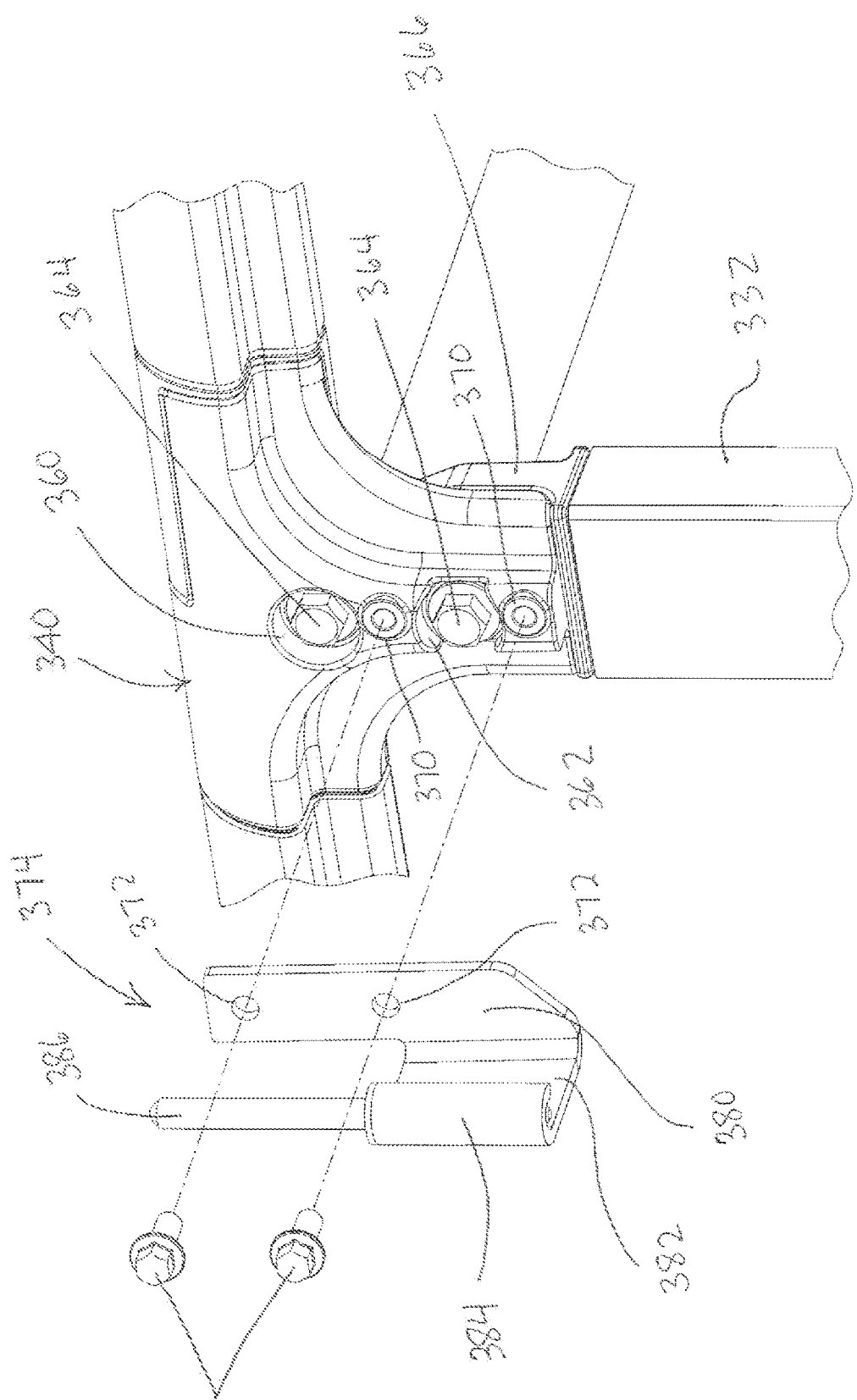
FIG. 24 shows the hinge of FIG. 23 exploded from the cab frame with the driver door removed.

As shown in FIG. 24, T-shaped coupler 340 includes two recesses 360 and 362 which receive fasteners 364 into the coupler 366 which is attached to a top of upright 332. Coupler 340 further includes threaded bosses 370 which align with apertures 372 of hinge half 374 of hinge 50 (FIG. 24). Hinge half 374 includes a plate portion 380 which couples to T-coupler 340 and a transverse portion 382 which presents a barrel portion 384 at a position outward of doors 42, 44 (FIG. 23) and an upstanding post 386. As shown in FIG. 23, a counterpart hinge portion 390 includes a plate portion 392 which couples to door 42 by way of fasteners 394 and includes a barrel 396 positioned over post 386. This allows door 42 and hinge portion 390 to rotate relative to hinge portion 374.

Figure 25:
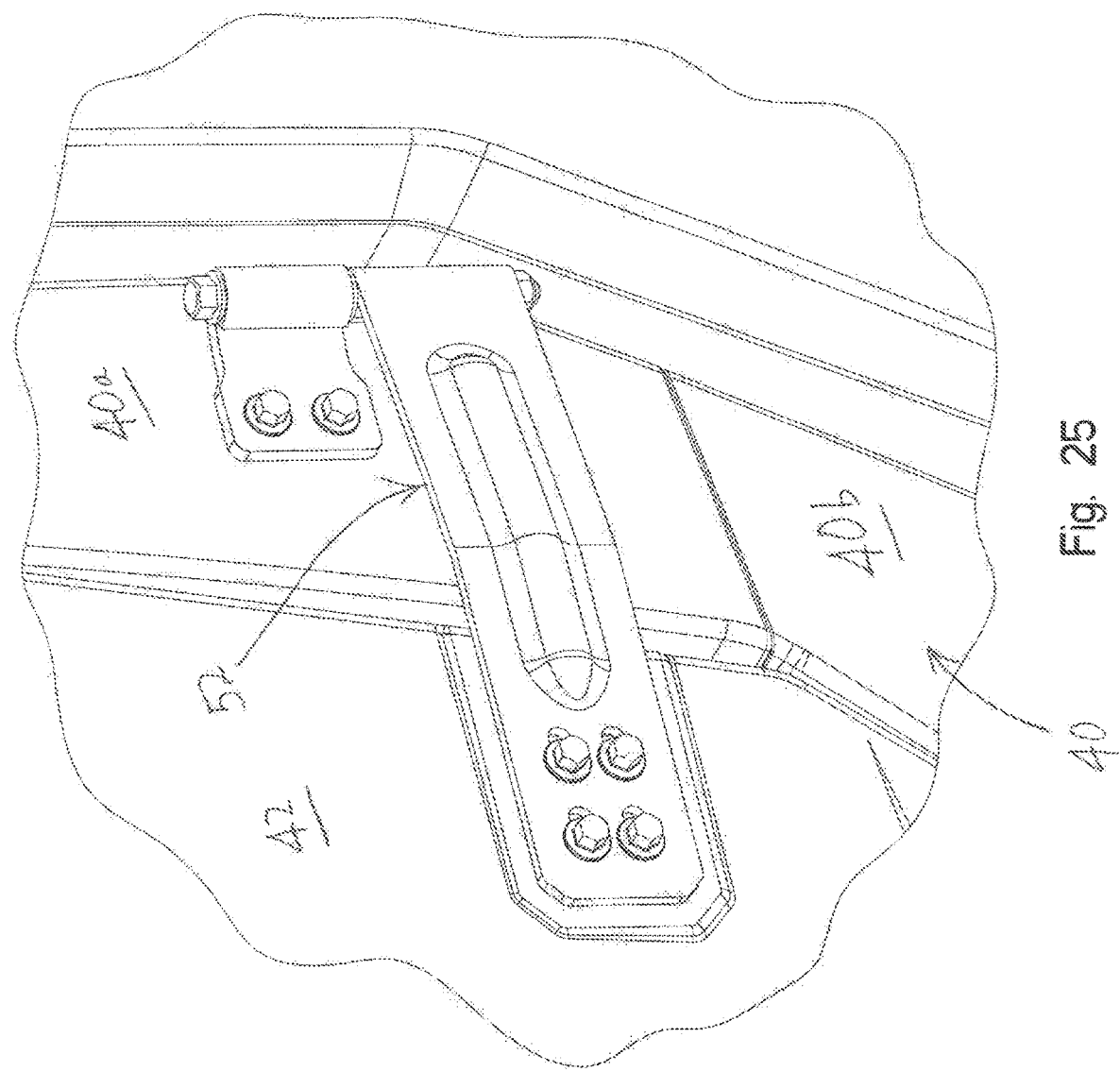
FIG. 25 shows the driver door lower hinge.
Figure 26:
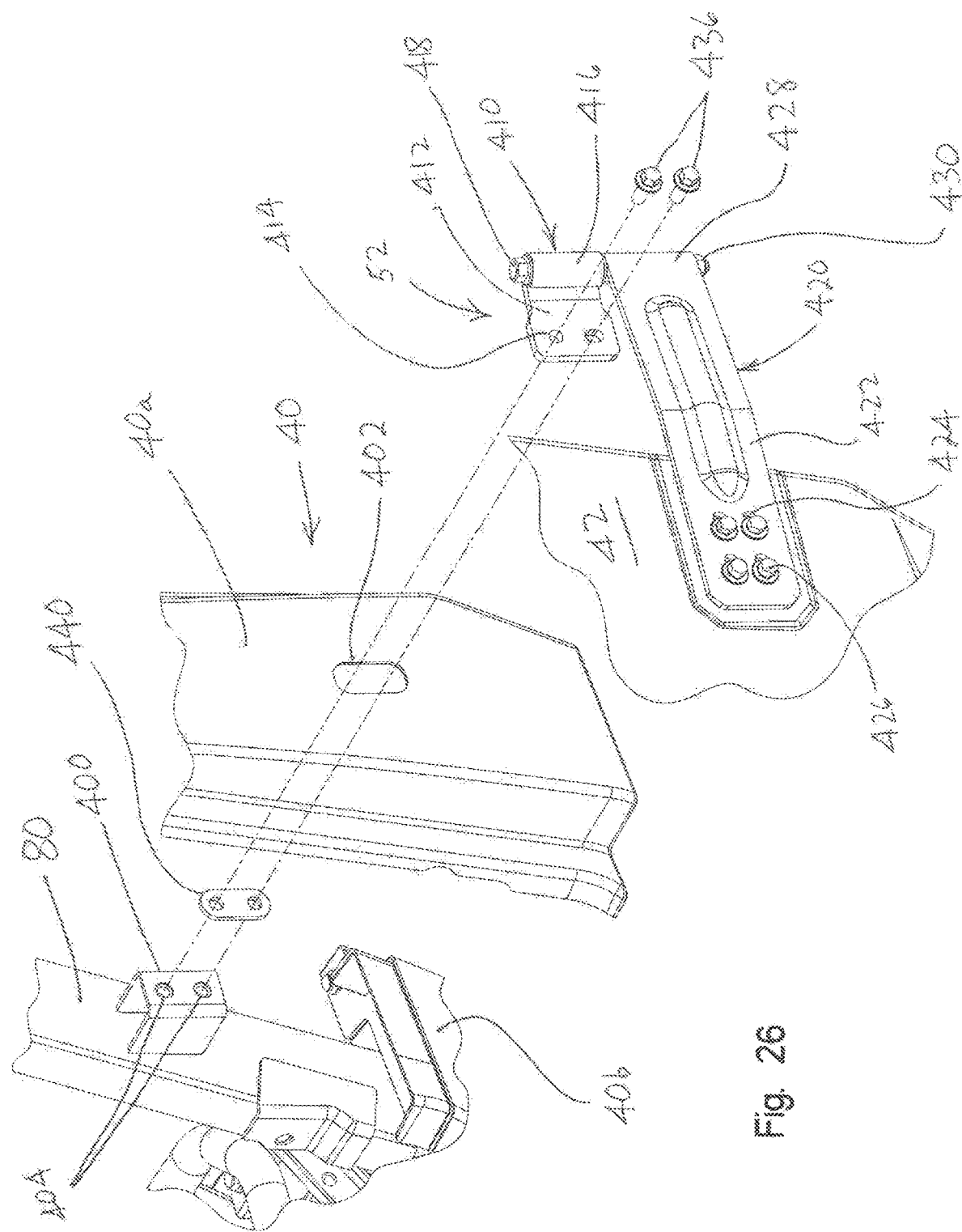
FIG. 26 shows the driver door hinge exploded away from the cab frame.

With reference now to FIGS. 25 and 26, hinge 52 will be described in greater detail. As shown best in FIG. 26, side panel 40 includes an upper panel portion 40a and a lower panel portion 40b. Side panels 40a and 40b cover upstanding post 80 where post 80 includes a mounting bracket 400 coupled thereto. Panel portion 40a includes a slot at 402 providing access to bracket 400 and to threaded apertures 404. Hinge 52 includes first portion 410 having a flange 412 having apertures 414 which align with threaded apertures 404. Hinge portion 410 includes a barrel portion 416 for receiving a fastener 418 therethrough. Hinge 52 further includes a hinge portion 420 including a hinge arm 422 having slots 424 for receipt of fasteners 426 therethrough for retention to door 42. A barrel portion 428 vertically aligns with barrel portion 416 to receive fastener 418 therethrough and to receive a counterpart threaded fastener 430 to couple hinge portions 410, 420 together. Fasteners 436 are received through apertures 414, through slot 402, through sealing washer 440 and into threaded engagement with threaded apertures 404. This combination provides a sealed interconnection between the hinge 52 and the side panel 40.

Figure 27:
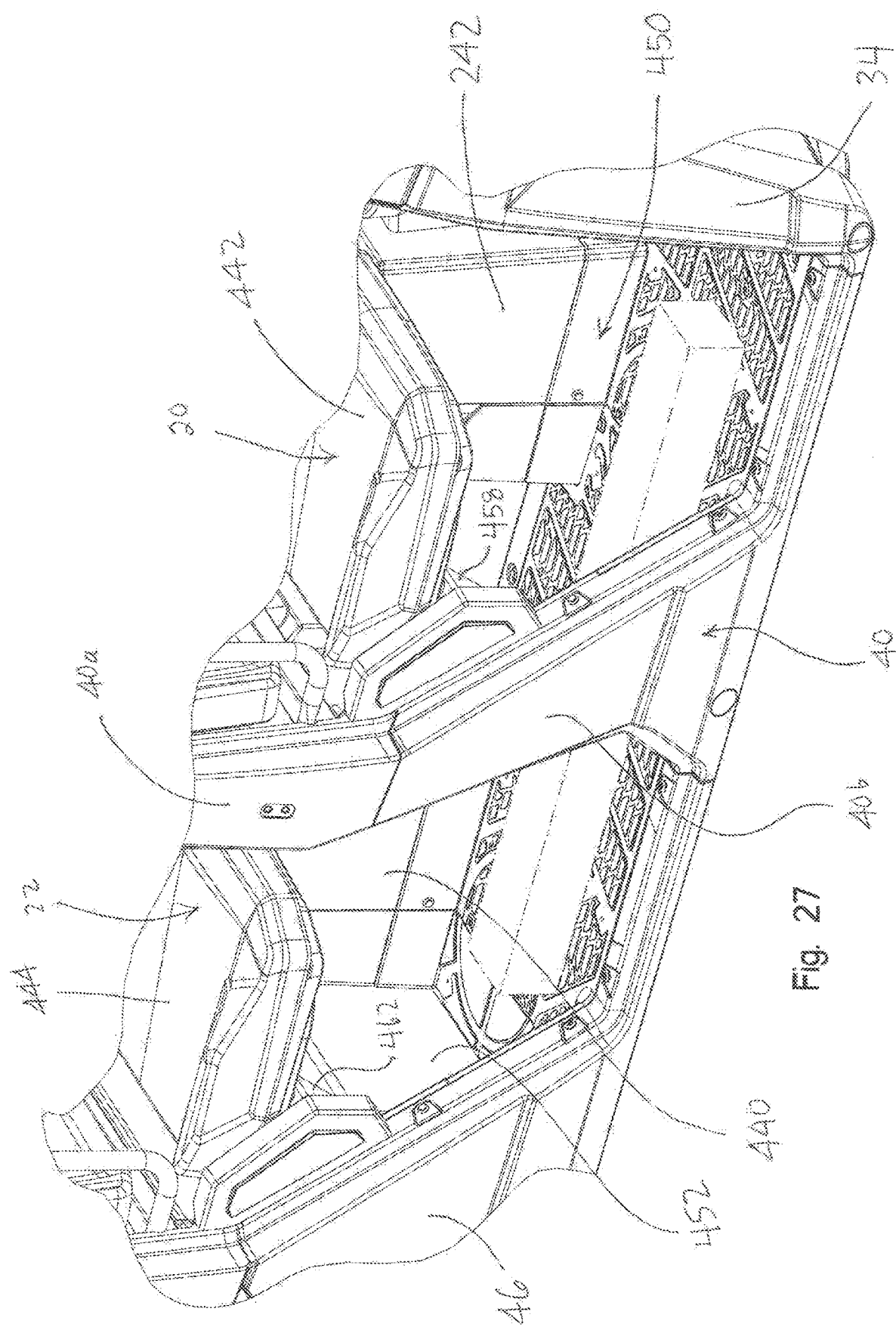
FIG. 27 shows the under seat storage on the right-hand side of the vehicle.

With reference now to FIG. 27, the front 20 and rear 22 operator and passenger compartments are shown with the doors 42 and 44 removed, respectively, and a rear pedestal 440 is shown positioned over rear seat frame 92 (FIG. 8). The vehicle includes a front bench seat 442 positioned over pedestal 242 and a rear passenger bench seat 444 positioned over pedestal 440. Bench seats 442 and 444 cantilever from their respective pedestals 242 and 440 to allow a storage space 450 beneath seats 442, 444 and from front panel 34 extending rearwardly to a rear panel 452. To support bench seat 442 in the cantilever position of FIG. 27, a bracket 456 is provided on frame 4 (FIG. 8) which includes a support 458 for receipt of a lower side of bench seat 444. In a like manner, frame 4 includes a bracket 460 (FIG. 8) having a support 462 for receiving a lower side of bench seat 444.

With reference now to FIG. 28, the body side panels are shown in an exploded manner showing front panel 34, mid panel 40 and rear panel 46. As shown, panel 40 includes a front trim portion 470 having a front male connector part 472 which is received in a counterpart female portion 474. In a like manner, rear panel 46 includes a trim portion 476 having a front male coupler at 478 which is received in a female coupler 480. It should be appreciated that when a single seat vehicle is used the center panel 40 is not utilized, whereas front panel 34 and rear panel 46 couple together with male coupler 478 coupling with female coupler 474.

With reference now to FIGS. 29-31, the increased foot area for the rear passengers will be described. As shown best in FIG. 29, rear panel 246 includes a recessed area 490 providing extra area for the rider's feet as shown in FIG. 31. An improved ingress is provided where upright 80 extends at a rearwardly extending angle (FIG. 30) with a front brace 492 and a rear brace 494 supporting upright 80 relative to frame tubes 76. As upright 80 extends rearwardly, side panel portion 40b can be contoured to match the upright 80 including a rear panel portion 500 which overlies rear brace 494 to provide a triangular ingress opening 502 (FIG. 31).

Ingress opening 502 defines the forwardmost position of the opening for the passengers to enter the rear seating area 22.

What is claims is:

1. A utility vehicle, comprising:
    a longitudinally extending frame having a longitudinal centerline, the frame comprising a front frame portion and a rear frame portion;
    ground engaging members supporting the frame;
    a cab comprising:
        a front seating section;
        a rear seating section;
        a mid-panel forward of the rear seating section separating the front and rear seating sections;
        an HVAC duct extending through and under the front seating section and coupling to the mid panel to deliver treated air to the rear seating area.

2. The utility vehicle of claim 1, wherein the HVAC duct has a flat contour in at least part of its length to lower the profile of the duct through the front seating section.

3. The utility vehicle of claim 2, wherein the HVAC duct has a substantially constant height.

4. The utility vehicle of claim 3, wherein the height is less than one inch.

5. The utility vehicle of claim 4, wherein the height is approximately 0.9 inch.

6. The utility vehicle of claim 2, wherein the HVAC duct has a variable width.

7. The utility vehicle of claim 6, wherein the width is greater than 5 inches at least in part along its length.

8. The utility vehicle of claim 7, wherein the ratio of the width/height is at least 4.

9. The utility vehicle of claim 7, wherein the ratio of the width/height is greater than 6.

10. The utility vehicle of claim 7, wherein the ratio of the width/height is in the range of 4-10.

11. The utility vehicle of claim 1, wherein the engine is positioned rearward of the rear seating section and an air conditioning compressor and an alternator are mounted adjacent to, and driven by, the engine.

12. The utility vehicle of claim 11, wherein an air conditioning system further comprises a refrigerant system and an evaporator, wherein the refrigerant system and evaporator are located forward of the front seating section and refrigerant lines run from a front of the vehicle to the rear of the vehicle.

* * * * *